(12) United States Patent  
Hendry et al.

(10) Patent No.: US 12,532,001 B2
(45) Date of Patent: *Jan. 20, 2026

(54) SUB-PICTURE BASED RANDOM ACCESS

(71) Applicant: Huawei Technologies Co., Ltd., Guangdong (CN)

(72) Inventors: FNU Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,421

(22) Filed: Oct. 31, 2023

(65) Prior Publication Data

US 2024/0187610 A1     Jun. 6, 2024

Related U.S. Application Data

(63) Continuation of application No. 17/365,670, filed on Jul. 1, 2021, now Pat. No. 11,936,882, which is a
(Continued)

(51) Int. Cl.
*H04N 19/172*     (2014.01)
*H04N 19/105*     (2014.01)
(Continued)

(52) U.S. Cl.
CPC ......... *H04N 19/172* (2014.11); *H04N 19/105* (2014.11); *H04N 19/107* (2014.11);
(Continued)

(58) Field of Classification Search
CPC .... H04N 19/105; H04N 19/107; H04N 19/17; H04N 19/172; H04N 19/184;
(Continued)

(56) References Cited

U.S. PATENT DOCUMENTS

2014/0301437 A1   10/2014   Wang
2014/0301485 A1*   10/2014   Ramasubramonian ..................... H04N 19/30
                                           375/240.27

(Continued)

FOREIGN PATENT DOCUMENTS

JP    2022501915 A    1/2022
JP    2022518368 A    3/2022
JP    2023133172 A    9/2023

OTHER PUBLICATIONS

Edited by Sakae Okubo, Impress standard textbook series H.265/HEVC Textbook, First Edition, Oct. 21, 2013, Impress Holdings, Inc., pp. 192-214, ISBN: 978-4-8443-3468-2. 37 pages in total (with an English abstract).

(Continued)

*Primary Examiner* — Shahan Ur Rahaman
(74) *Attorney, Agent, or Firm* — Conley Rose, P.C.

(57) ABSTRACT

A method of decoding a coded video bitstream implemented by a video decoder is provided. The method includes receiving, by a receiver of the video decoder, a mixed intra random access point (IRAP) picture including a first sub-picture and a second sub-picture, wherein the first sub-picture is an IRAP picture and the second sub-picture is a non-IRAP sub-picture; receiving, by the receiver; a reference picture list (RPL) for the mixed IRAP picture; decoding, by a processor of the video decoder, the second sub-picture using the RPL; and generating, by the processor, an image based on the second sub-picture as decoded. A corresponding encoding method is also provided.

22 Claims, 8 Drawing Sheets

Related U.S. Application Data continuation of application No. PCT/US2020/012205, filed on Jan. 3, 2020.

(60) Provisional application No. 62/788,634, filed on Jan. 4, 2019.

(51) Int. Cl.
| | |
|---|---|
| H04N 19/107 | (2014.01) |
| H04N 19/169 | (2014.01) |
| H04N 19/184 | (2014.01) |
| H04N 19/46 | (2014.01) |
| H04N 19/52 | (2014.01) |

(52) U.S. Cl.
CPC ......... *H04N 19/184* (2014.11); *H04N 19/188* (2014.11); *H04N 19/46* (2014.11); *H04N 19/52* (2014.11)

(58) Field of Classification Search
CPC ...... H04N 19/188; H04N 19/46; H04N 19/52; H04N 19/58; H04N 19/597; H04N 19/70
See application file for complete search history.

(56) References Cited

U.S. PATENT DOCUMENTS

| 2015/0319462 | A1* | 11/2015 | Ramasubramanian ..................... H04N 19/70 375/240.29 |
| 2015/0382023 | A1* | 12/2015 | Ramasubramanian ..................... H04N 19/70 375/240.25 |
| 2016/0219273 | A1* | 7/2016 | Pettersson ............... H04N 19/58 |
| 2016/0219306 | A1 | 7/2016 | Pettersson et al. |
| 2016/0241866 | A1 | 8/2016 | Kang et al. |
| 2016/0353115 | A1 | 12/2016 | Samuelsson et al. |
| 2018/0101967 | A1 | 4/2018 | Hong et al. |
| 2020/0177922 | A1* | 6/2020 | Chujoh .................. H04N 19/70 |
| 2022/0053207 | A1 | 2/2022 | Deshpande |
| 2022/0078486 | A1* | 3/2022 | Hannuksela ....... H04N 21/2393 |

OTHER PUBLICATIONS

Edited by Wataru Kameyama et al., Impress standard textbook series Digital Broadcasting Textbook in IPTV era, First Edition, Apr. 1, 2010, Impress R&D, pp. 147-151, ISBN: 978-4-8443-2853-7. (especially, Figs. 4-22 on p. 151), 31 pages in total (with an English abstract).
Ebrahimi, T., et al., "MPEG-4 natural video coding—An overview," Signal Processing; Image Communication, Elsevier Science Publishers, Amsterdam, NL, vol. 15, No. 4-5, XP027357196, ISSN: 0923-5965, Jan. 1, 2000, pp. 365-385.
JVET-P0124-v1, Wang, Y.K. et al., "AHG17: On mixed NAL unit types within a picture," Joint Video Experts Team (JVET) of ITU-T SG 16 WP 3 and ISO/IEC JTC 1/SC 29/WG 11,16th Meeting: Geneva, CH, Oct. 1-11, 2019, 3 pages.
Fleury, P., et al., "MPEG-4 video verification model:A solution for interactive multimedia applications", XP 000771758, Journal of Electronic Imaging7(3), Jul. 1998, pp. 502-515.
JVET-M0131-v1, Wang, Y.K. et al., "AHG17: On NAL unit types for IRAP pictures and leading pictures", Joint Video Experts Team (JVET) of ITU-T SG 16 WP 3 and ISO/IEC JTC 1/SC 29/WG 11,13th Meeting: Marrakech, MA, Jan. 9-18, 2019, 3 pages.
Bross, et al., "Versatile Video Coding (Draft 3)," Joint Video Experts Team (JVET) of ITU-T SG 16 WP 3 and ISO/IEC JTC 1/SC 29/WG 11, 12th Meeting: Macao, CN, 3â€ Oct. 12, 2018, Document JVET-L1001v7, 226 pages.
"Line Transmission of Non-Telephone Signals, Video Codec for Audiovisual Services at p x 64 kbits," ITU-T Recommendation H.261, Mar. 3, 1993, 29 pages.
"Transmission of Non-Telephone Signals, Information Technology—Generic Coding of Moving Pictures and Associated Audio Information: Video," ITU-T H.262, Jul. 1995, 211 pages.
"Video Coding for Low Bit Rate Communication," Series H: Auddiovisual and Multimedia Systems Infrastructure of Audiovisual Services—Coding of Moving Video, ITU-T H.263, Jan. 2005, 226 pages.
"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.
"High Efficiency Video Coding," Series H: Audiovisual and Multimedia Systems Infrastructure of Audiovisual Services—Coding of Moving Video, ITU-T H.265, Dec. 2016, 664 pages.
Sullivan, et al., "Meeting Report of the 12th meeting of the Joint Video Experts Team (JVET), Macao, CN, 3â€ Oct. 12, 2018," Joint Video Experts Team (JVET) of ITU-T SG 16 WP 3 and ISO/IEC JTC 1/SC 29/WG 11, Document JVET-L_Notices_d8, 280 pages.
Bross, et al., "Versatile Video Coding (Draft 2)," Document JVET-K1001-v5, Joint Video Experts Team (JVET) of ITU-T SG 16 WP 3 and ISO/IEC JTC 1/SC 29/WG 11, 11th Meeting: Ljubljana, SI, Jul. 10-18, 2018, 136 pages.
Bross, et al, "Versatile Video Coding (Draft 2)," Document JVET-K1001-v6, Joint Video Experts Team (JVET) of ITU-T SG 16 WP 3 and ISO/IEC JTC 1/SC 29/WG 11, 11th Meeting: Ljubljana, SI, Jul. 10-18, 2018, 146 pages.
Wang, et al., "On Reference Picture Management for VVC," Document JVET-L0112-v4, Joint Video Experts Team (JVET) of ITU-T SG 16 WP 3 and ISO/IEC JTC 1/SC 29/WG 11, 12th Meeting: Macao, CN, Oct. 3-12, 2018, 15 pages.
Wang, et al., "On Slicing and Tiling in VVC," Joint Video Experts Team (JVET) of ITU-T SG 16 WP 3 and ISO/IEC JTC 1/SC 29/WG 11, 12th Meeting: Macao, CN, Oct. 3-12, 2018, Document JVET-L0114-v1, 5 pages.
Bross, et al., "WD4: Working Draft 4 of High-Efficiency Video Coding," Document JCTVC-F803_d5, Joint Collaborative Team on Video Coding (JCT-VC) of ITU-T SG16 WP3 and ISO-IEC JTC1/SC29/WG11 6th Meeting: Torino, IT, Jul. 14-22, 2011, 243 pages.
Hannuksela, et al., "AHG21: On Reference Picture List Construction and Reference Picture Marking," Document: JCTVC-G643, Joint Collaborative Team on Video Coding (JCT-VC) of ITU-T SG16 WP3 and ISO/IEC JTC1/SC29/ WG11 7th Meeting Geneva, CH, Nov. 21-30, 2011, 10 pages.
Hannuksela, et al., "AHG21: On Reference Picture List Construction and Reference Picture Marking," Document: JCTVC-G643r1, Joint Collaborative Team on Video Coding (JCT-VC) of ITU-T SG16 WP3 and ISO/IEC JTC1/SC29/ WG11 7th Meeting Geneva, CH, Nov. 21-30, 2011, 17 pages.
Wang, et al, "Spec Text for the Agreed Starting Point on Slicing and Tiling," Document: JVET-L0686-v2, Joint Video Experts Team (JVET) of ITU-T SG16 WP 3 and ISO/IEC JTC 1/SC 29/WG11 12th Meeting: Macao, CN, Oct. 3-12, 2018, 1 page.
JCTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.
Document: JVET-M0132-v1, Wang, Y.K., et al., "AHG17: On header parameter set (HPS)," Joint Video Experts Team (JVET) of ITU-T SG 16 WP 3 and ISO/IEC JTC 1/SC 29/WG 11, 13th Meeting: Marrakech, MA, Jan. 9-18, 2019, 4 pages.
Document: JVET-O0176, Deshpande, S., "On Tiles, Bricks and Slices," Joint Video Experts Team (JVET) of ITU-T SG 16 WP 3 and ISO/IEC JTC 1/SC 29/WG 11, 15th Meeting: Gothenburg, SE, Jul. 3-12, 2019, 21 pages.
Rickard Sjöberg et al, "HLS: Error robust POC alignment," Document: JCTVC-O0176v3, m30941, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, 8 pages.

\* cited by examiner

SUB-PICTURE BASED RANDOM ACCESS

CROSS-REFERENCE TO RELATED APPLICATIONS

This application is a continuation of U.S. patent application Ser. No. 17/365,670 filed on Jul. 1, 2021, which is a continuation of International Application No. PCT/US2020/012205 filed on Jan. 3, 2020, which claims the benefit of U.S. Provisional Patent Application No. 62/788,634, filed Jan. 4, 2019, each of which is hereby incorporated by reference.

TECHNICAL FIELD

In general, this disclosure describes techniques for support of sub-picture based random access in video coding. More specifically, this disclosure describes techniques for allowing a picture to contain one or more regions that are identified as intra random access point and at the same time the remaining regions that are identified as non-intra random access point.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method includes receiving, by a receiver of the video decoder, a mixed intra random access point (IRAP) picture including a first sub-picture and a second sub-picture, wherein the first sub-picture is an IRAP picture and the second sub-picture is a non-TRAP sub-picture; receiving, by the receiver; a reference picture list (RPL) for the mixed IRAP picture; decoding, by a processor of the video decoder, the second sub-picture using the RPL; and generating, by the processor, an image based on the second sub-picture as decoded.

While conventional coding techniques do not permit IRAP pictures to reference and utilize an RPL, the techniques disclosed herein permit TRAP pictures, and specifically mixed TRAP pictures, to reference and utilize the RPL. Therefore, even though the mixed TRAP picture contains an TRAP sub-picture, the codec is permitted to reference and utilize the RPL to code the non-TRAP sub-picture. This is particularly beneficial in VR coding applications. As such, the coder/decoder (a.k.a., "codec") in video coding is improved relative to current codecs. As a practical matter, the improved video coding process offers the user a better user experience when videos are sent, received, and/or viewed.

In a first implementation form of the method according to the first aspect as such, the mixed IRAP picture is received in a divided bitstream containing a first sub-bitstream and a second sub-bitstream.

In a second implementation form of the method according to the first aspect as such or any preceding implementation form of the first aspect, the first sub-picture is disposed in a first sub-bitstream and the second sub-picture is disposed in a second sub-bitstream.

In a third implementation form of the method according to the first aspect as such or any preceding implementation form of the first aspect, the IRAP picture is an instantaneous decoder refresh (IDR) picture.

In a fourth implementation form of the method according to the first aspect as such or any preceding implementation form of the first aspect, the first sub-picture is an TRAP picture contained within a first network abstraction layer (NAL) unit and the second sub-picture is a non-IRAP sub-picture contained within a second NAL unit.

In a fifth implementation form of the method according to the first aspect as such or any preceding implementation form of the first aspect, the method further comprises receiving a flag in the bitstream, the flag indicating whether the bitstream contains any mixed TRAP pictures.

In a sixth implementation form of the method according to the first aspect as such or any preceding implementation form of the first aspect, the flag is in a sequence parameter set (SPS) of the bitstream.

In a seventh implementation form of the method according to the first aspect as such or any preceding implementation form of the first aspect, the flag is designated sps_mixed_tile_groups_in_pic_flag.

A second aspect relates to a method of encoding a video bitstream implemented by a video encoder. The method includes encoding, by a processor of the video encoder, a mixed intra random access point (TRAP) picture including a first sub-picture and a second sub-picture, wherein the first sub-picture is an IRAP picture and the second sub-picture is a non-TRAP sub-picture; encoding, by processor, a reference picture list (RPL) for the mixed TRAP picture; generating, by the processor, a bitstream containing the mixed TRAP picture and the RPL corresponding to the mixed TRAP picture; and storing, in a memory of the video encoder, the bitstream for transmission toward a video decoder.

While conventional coding techniques do not permit IRAP pictures to reference and utilize an RPL, the techniques disclosed herein permit TRAP pictures, and specifically mixed TRAP pictures, to reference and utilize the RPL. Therefore, even though the mixed TRAP picture contains an TRAP sub-picture, the codec is permitted to reference and utilize the RPL to code the non-TRAP sub-picture. This is particularly beneficial in VR coding applications. As such, the coder/decoder (a.k.a., "codec") in video coding is improved relative to current codecs. As a practical matter, the improved video coding process offers the user a better user experience when videos are sent, received, and/or viewed.

In a first implementation form of the method according to the second aspect as such, the mixed TRAP picture is encoded into a divided bitstream containing a first sub-bitstream and a second sub-bitstream.

In a second implementation form of the method according to the second aspect as such or any preceding implementation form of the second aspect, the first sub-picture is encoded in a first sub-bitstream and the second sub-picture is encoded in a second sub-bitstream.

In a third implementation form of the method according to the second aspect as such or any preceding implementation form of the second aspect, the TRAP picture is an instantaneous decoder refresh (IDR) picture.

In a fourth implementation form of the method according to the second aspect as such or any preceding implementation form of the second aspect, the first sub-picture is an TRAP picture contained within a first network abstraction layer (NAL) unit and the second sub-picture is a non-IRAP sub-picture contained within a second NAL unit.

In a fifth implementation form of the method according to the second aspect as such or any preceding implementation form of the second aspect, the method further comprises encoding a flag in the bitstream, the flag indicating whether the bitstream contains any mixed IRAP pictures.

In a sixth implementation form of the method according to the second aspect as such or any preceding implementation form of the second aspect, the flag is in a sequence parameter set (SPS) of the bitstream.

In a seventh implementation form of the method according to the second aspect as such or any preceding implementation form of the second aspect, the flag is designated sps_mixed_tile_groups_in_pic_flag.

A third aspect relates to a decoding device. The decoding device includes a receiver configured to receive a coded video bitstream containing: a mixed intra random access point (RAP) picture including a first sub-picture and a second sub-picture, wherein the first sub-picture is an RAP picture and the second sub-picture is a non-RAP sub-picture; and a reference picture list (RPL) for the mixed IRAP picture; a memory coupled to the receiver, the memory storing instructions; and a processor coupled to the memory, the processor configured to execute the instructions to cause the decoding device to: decode the second sub-picture using the RPL; and generate an image based on the second sub-picture as decoded.

While conventional coding techniques do not permit RAP pictures to reference and utilize an RPL, the decoding device disclosed herein permits IRAP pictures, and specifically mixed IRAP pictures, to reference and utilize the RPL. Therefore, even though the mixed IRAP picture contains an RAP sub-picture, the codec is permitted to reference and utilize the RPL to code the non-IRAP sub-picture. This is particularly beneficial in VR coding applications. As such, the coder/decoder (a.k.a., "codec") in video coding is improved relative to current codecs. As a practical matter, the improved video coding process offers the user a better user experience when videos are sent, received, and/or viewed.

In a first implementation form of the decoding device according to the fourth aspect as such, the decoding device further comprises a display configured to display the image.

In a second implementation form of the decoding device according to the third aspect as such or any preceding implementation form of the third aspect, the receiver is configured to receive the mixed TRAP picture in a divided bitstream containing a first sub-bitstream and a second sub-bitstream.

In a third implementation form of the decoding device according to the third aspect as such or any preceding implementation form of the third aspect, the first sub-picture is disposed in a first sub-bitstream and the second sub-picture is disposed in a second sub-bitstream.

In a fourth implementation form of the decoding device according to the third aspect as such or any preceding implementation form of the third aspect, the TRAP picture is an instantaneous decoder refresh (IDR) picture.

A fourth aspect relates to an encoding device. The encoding device includes a memory containing instructions; a processor coupled to the memory, the processor configured to implement the instructions to cause the encoding device to: encode a mixed intra random access point (RAP) picture including a first sub-picture and a second sub-picture, wherein the first sub-picture is an RAP picture and the second sub-picture is a non-IRAP sub-picture; encode a reference picture list (RPL) for the mixed TRAP picture; generate a bitstream containing the mixed TRAP picture and the RPL corresponding to the mixed TRAP picture; and store the bitstream in the memory for transmission toward a video decoder.

While conventional coding techniques do not permit TRAP pictures to reference and utilize an RPL, the encoding device disclosed herein permits TRAP pictures, and specifically mixed TRAP pictures, to reference and utilize the RPL. Therefore, even though the mixed TRAP picture contains an RAP sub-picture, the codec is permitted to reference and utilize the RPL to code the non-IRAP sub-picture. This is particularly beneficial in VR coding applications. As such, the coder/decoder (a.k.a., "codec") in video coding is improved relative to current codecs. As a practical matter, the improved video coding process offers the user a better user experience when videos are sent, received, and/or viewed.

In a first implementation form of the encoding device according to the fourth aspect as such, the encoding device further comprises a transmitter coupled to the processor, the transmitter configured to transmit the bitstream toward the video decoder.

In a second implementation form of the encoding device according to the fourth aspect as such, the mixed RAP picture is encoded into a divided bitstream containing a first sub-bitstream and a second sub-bitstream.

In a third implementation form of the encoding device according to the fourth aspect as such, the first sub-picture is encoded in a first sub-bitstream and the second sub-picture is encoded in a second sub-bitstream.

In a fourth implementation form of the encoding device according to the fourth aspect as such, the TRAP picture is an instantaneous decoder refresh (IDR) picture.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform the methods described herein.

While conventional coding techniques do not permit IRAP pictures to reference and utilize an RPL, the coding apparatus disclosed herein permits TRAP pictures, and specifically mixed TRAP pictures, to reference and utilize the RPL. Therefore, even though the mixed TRAP picture contains an IRAP sub-picture, the codec is permitted to reference and utilize the RPL to code the non-IRAP sub-picture. This is particularly beneficial in VR coding applications. As such, the coder/decoder (a.k.a., "codec") in video coding is improved relative to current codecs. As a practical matter, the improved video coding process offers the user a better user experience when videos are sent, received, and/or viewed.

A sixth aspect relates to a system. The system includes an encoder; and a decoder in communication with the encoder, wherein the encoder or the decoder includes the decoding device, the encoding device, or the coding apparatus disclosed herein.

While conventional coding techniques do not permit IRAP pictures to reference and utilize an RPL, the system disclosed herein permits IRAP pictures, and specifically mixed IRAP pictures, to reference and utilize the RPL. Therefore, even though the mixed IRAP picture contains an IRAP sub-picture, the codec is permitted to reference and utilize the RPL to code the non-IRAP sub-picture. This is particularly beneficial in VR coding applications. As such, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a bitstream to decode; transmission means coupled to the receiving means, the transmission means configured to transmit a decoded image to a display means; storage means coupled to at least one of the receiving means or the transmission means, the storage means configured to store instructions; and processing means coupled to the storage means, the processing means configured to execute the instructions stored in the storage means to perform the methods disclosed herein.

While conventional coding techniques do not permit RAP pictures to reference and utilize an RPL, the means for coding disclosed herein permits TRAP pictures, and specifically mixed TRAP pictures, to reference and utilize the RPL. Therefore, even though the mixed TRAP picture contains an RAP sub-picture, the codec is permitted to reference and utilize the RPL to code the non-IRAP sub-picture. This is particularly beneficial in VR coding applications. As such, the coder/decoder (a.k.a., "codec") in video coding is improved relative to current codecs. As a practical matter, the improved video coding process offers the user a better user experience when videos are sent, received, and/or viewed.

An eighth aspect relates to a decoding device. The decoding device includes a receiver configured to receive a coded video bitstream; a processor coupled to the receiver, the processor configured to: parse a flag within the coded video bitstream, wherein a value of the flag indicates that a picture within the coded video bitstream has mixed network abstraction layer (NAL) unit types; decode the picture as a non-intra random access point (IRAP) picture based on the value of the flag; and generate an image based on the picture as decoded.

The decoding device disclosed herein allows the decoding device to identify which pictures in the coded video bitstream contain mixed network abstraction layer (NAL) unit types. That is, the decoding device is configured to parse a flag in the coded video bitstream to identify that the picture contains a mixed NAL unit type. Even when the picture has an IRAP NAL unit type, the picture is decoded as a non-IRAP picture based on the value of the flag.

In a first implementation form of the encoding device according to the eighth aspect as such, the picture is decoded as the non-IRAP picture when the picture has an IRAP NAL unit type.

In a second implementation form of the encoding device according to the eighth aspect as such, the value of the flag is one.

As a practical matter, the improved video coding process offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The following are various acronyms employed herein: Coded Video Sequence (CVS), Decoded Picture Buffer (DPB), Instantaneous Decoding Refresh (IDR), Intra Random Access Point (IRAP), Least Significant Bit (LSB), Most Significant Bit (MSB), Network Abstraction Layer (NAL), Picture Order Count (POC), Raw Byte Sequence Payload (RBSP), Sequence Parameter Set (SPS), and Working Draft (WD).

Figure 1:
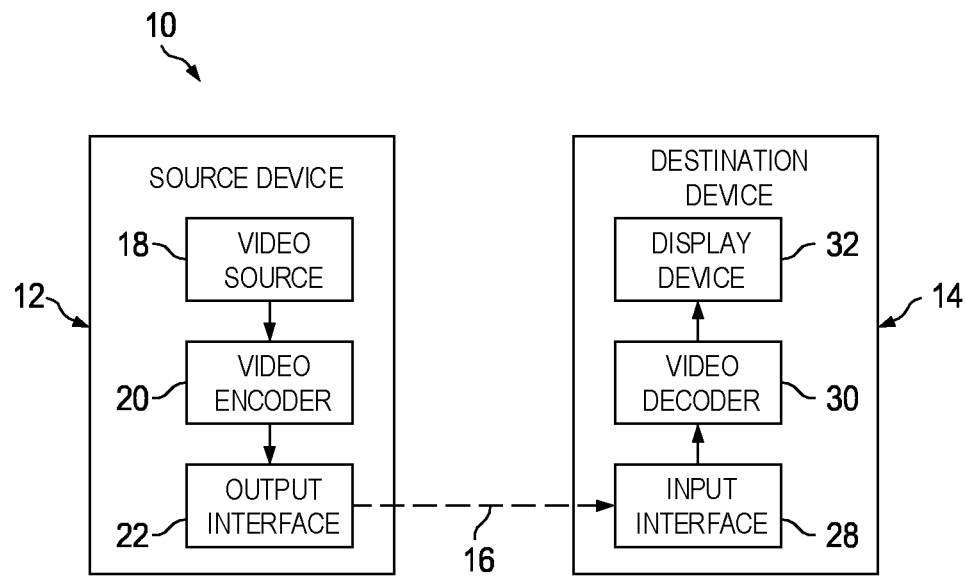
FIG. 1 is a block diagram illustrating an example coding system that may utilize bi-lateral prediction techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
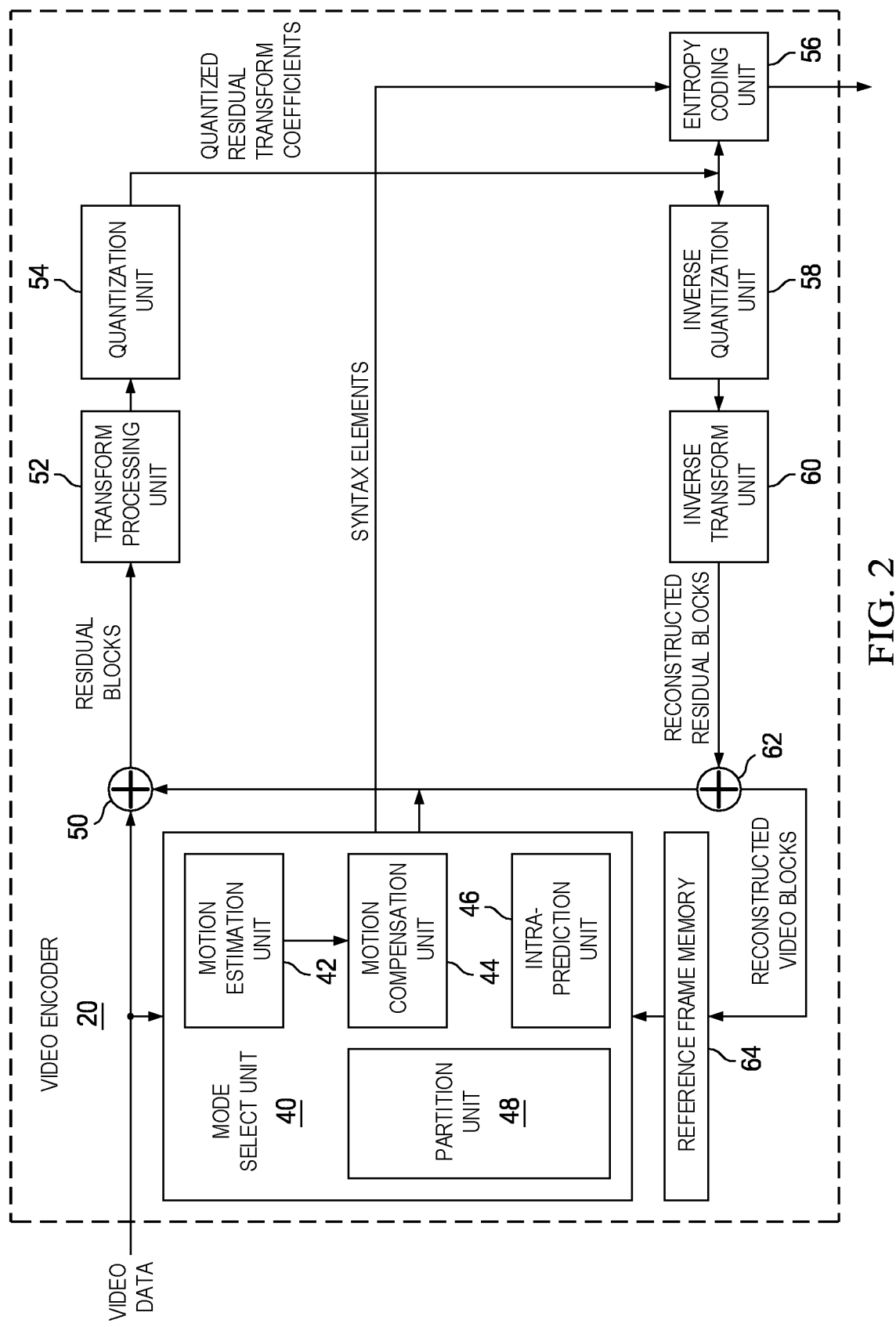
FIG. 2 is a block diagram illustrating an example video encoder that may implement bi-lateral prediction techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
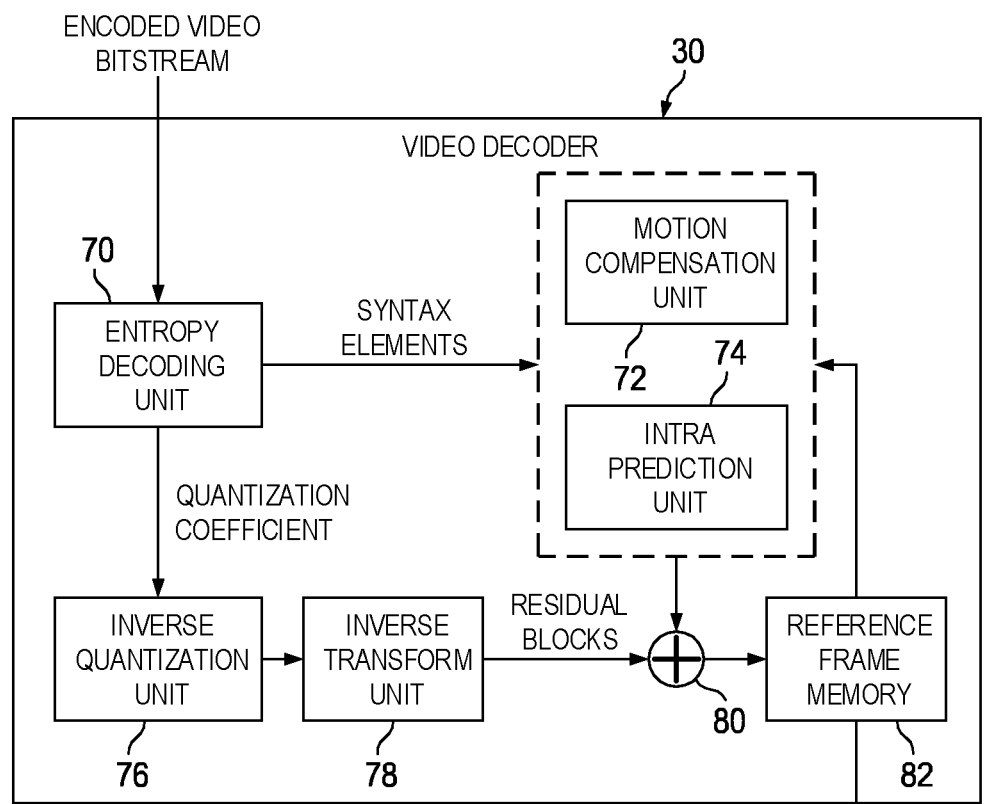
FIG. 3 is a block diagram illustrating an example of a video decoder that may implement bi-lateral prediction techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Image and video compression has experienced rapid growth, leading to various coding standards. Such video coding standards include ITU-T H.261, ISO/IEC MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. The latest Working Draft (WD) of VVC included in JVET-L1001-v1, which is publicly available at http://phenix.it-sudparis.eu/jvet/doc_end_user/documents/12_Macao/wg11/JVET-L1001-v11.zip. The techniques disclosed herein are based on the under-development of VVC by the joint video experts team (JVET) of ITU-T and ISO/IEC. However, the techniques also apply to other video/media codec specifications.

The video coding basics are discussed.

Video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Picture types in video coding are discussed.

In a video codec specification, picture types need to be identified for defining decoding processes, including for derivation of picture identification (e.g., POC), for marking of reference pictures status in the DPB, for output of pictures from the DPB, and so on.

In AVC and HEVC, picture types can be identified from the NAL unit type that contains the coded picture. Picture types in AVC include an IDR picture and a non-IDR picture. On the other hand, major picture types in HEVC include a trailing picture, a temporal sub-layer access picture (TSA), a step-wise temporal sub-layer access picture (STSA), a random access decodable leading picture (RADL), a random access skipped leading picture (RASL), a broken-link access picture (BLA), an instantaneous random access, and a clean random access. For each of those major picture types in HEVC, the picture can be further differentiated as either a sub-layer referenced picture or a sub-layer non-referenced picture. A BLA picture is further differentiated as either a BLA with leading picture, a BLA with RADL picture, or a BLA without leading picture. An IDR picture is further differentiated as either an IDR with RADL picture or an IDR without leading picture.

Intra random access point (TRAP) pictures are discussed.

In HEVC, IDR, BLA, and clean random access (CRA) pictures together are considered as intra random access point (TRAP) pictures. For VVC, during the 12$^{th}$ JVET meeting in October 2018, it was agreed to have both IDR and CRA pictures as TRAP pictures.

An TRAP picture provides the following two important functionalities or benefits. Firstly, the presence of an TRAP picture indicates that the decoding process can start from that picture. This functionality allows a random access feature in which the decoding process starts at position in a bitstream, not necessarily the beginning of a bitstream, as long as an TRAP picture is present at that position. Secondly, the presence of an TRAP picture refreshes the decoding process such that coded pictures starting at the IRAP picture, excluding RASL pictures, are coded without any reference to previous pictures. Having the TRAP picture present in a bitstream prevents any error that may have happened during decoding of the coded pictures prior to the IRAP picture from propagating to the IRAP picture and those pictures that follow the IRAP picture in decoding order.

While IRAP pictures provide important functionalities, TRAP pictures may come with a penalty to the compression efficiency. For example, the presence of an IRAP picture may cause a surge in bit-rate. The penalty to the compression efficiency has two causes. Firstly, because an TRAP picture is an intra-predicted picture, the picture itself needs more bits to represent relative to other inter-predicted pictures. Secondly, an TRAP picture breaks temporal prediction. For example, when an TRAP picture is encountered during the decoding process, the DPB is refreshed to remove previous reference pictures. In addition, the TRAP picture causes the coding of pictures following the IRAP picture in decoding order to be less efficient. For example, the pictures following the TRAP picture in decoding order need more bits to represent because those pictures have less reference pictures for their inter-prediction coding.

Among the picture types considered to be an IRAP picture, an IDR picture in HEVC has different signaling and derivation when compared to other picture types. Some of the differences are as follows.

For signaling and derivation of a POC value of an IDR picture, the most significant bit (MSB) of the POC is not derived from previous key picture. Rather, the MSB is simply set to be equal to 0.

A slice header of an IDR picture does not contain information needed to be signaled to assist reference picture management. For other picture types (e.g., CRA, Trailing, TSA, etc.), information such as a reference picture set (RPS) described below or some other form of similar information (e.g., reference picture lists) is needed for the reference pictures marking process (e.g., the process of determining the status of reference pictures in the DPB, either used for reference or unused for reference). However, for an IDR picture, such information does not need to be signaled because the presence of IDR indicates that the decoding process shall simply mark all reference pictures in the DPB as unused for reference.

Reference picture management in video coding is discussed.

In addition to picture types, picture identification is also needed for multiple purposes including for use as a reference picture in inter prediction, for output of pictures from the decoded picture buffer (DPB), for scaling of motion vectors, for weighted prediction, and so on. In AVC and HEVC, pictures can be identified by picture order count (POC).

In AVC and HEVC, pictures in the DPB can be marked as "used for short-term reference," "used for long-term reference," or "unused for reference." Once a picture has been marked "unused for reference," the picture can no longer be used for prediction. When that picture is no longer needed for output, the picture can be removed from the DPB.

In AVC, there are two types of reference pictures, short-term and long-term. A reference picture may be marked as "unused for reference" when that picture is no longer needed for a prediction reference. The conversion among these three statuses (short-term, long-term, and unused for reference) is controlled by the decoded reference picture marking process. There are two alternative decoded reference picture marking mechanisms, the implicit sliding window process and the explicit memory management control operation (MMCO) process. The sliding window process marks a short-term reference picture as "unused for reference" when the number of reference frames is equal to a given maximum number (e.g., the max_num_ref_frames in the SPS). The short-term reference pictures are stored in a first-in, first-out manner so that the most recently decoded short-term pictures are kept in the DPB.

The explicit MMCO process may include multiple MMCO commands. An MMCO command may mark one or more short-term or long-term reference picture as "unused for reference," mark all the pictures as "unused for reference," or mark the current reference picture or an existing short-term reference picture as long-term, and assign a long-term picture index to that long-term reference picture.

In AVC the reference picture marking operations as well as the processes for output and removal of pictures from the DPB are performed after a picture has been decoded.

HEVC introduces a different approach for reference picture management, referred to as reference picture set (RPS). The most fundamental difference with the RPS concept compared to the MMCO/sliding window of AVC is that for each particular slice a complete set of the reference pictures used by the current picture or any subsequent picture is provided. Thus, a complete set of all pictures kept in the DPB for use by the current or future picture is signaled. This is different from the AVC scheme where only relative changes to the DPB are signaled. With the RPS concept, no information from earlier pictures in decoding order is needed to maintain the correct status of reference pictures in the DPB.

The order of picture decoding and DPB operations in HEVC are changed compared to AVC in order to exploit the advantages of RPS and improve error resilience. In AVC, picture marking and buffer operations (both output and removal of decoded pictures from the DPB) are generally applied after a current picture has been decoded. In HEVC, the RPS is first decoded from a slice header of the current picture, then picture marking and buffer operations are generally applied before decoding the current picture.

The signaling of RPS in HEVC is discussed.

Each slice header in HEVC includes parameters for signaling of the RPS for the picture containing the slices. The only exception is that no RPS is signaled for IDR slices. Instead, the RPS is inferred to be empty. For I slices that do not belong to an IDR picture, an RPS may be provided even if the I slices belong to an I picture. This is because there may be pictures following the I picture in decoding order that use inter-prediction based on pictures that preceded the I picture in decoding order. The number of pictures in an RPS shall not exceed the DPB size limit as specified by the sps_max_dec_pic_buffering syntax element in the SPS.

Each picture is associated with a POC value that represents the output order. The slice headers contain a fixed-length codeword, pic_order_cnt_lsb, representing the least significant bits of the full POC value, also known as the POC LSB. The length of the codeword is signaled in the SPS and can be between 4 and 16 bits. The RPS concept uses POC to identify reference pictures. Besides the slice header's own POC value, each slice header directly contains or inherits from the SPS a coded representation of the POC values (or the LSBs) of each picture in the RPS.

The RPS for each picture consists of five different lists of reference pictures, also referred to the five RPS subsets. RefPicSetStCurrBefore consists of all short-term reference pictures that are prior to the current picture in both decoding order and output order, and that may be used in inter prediction of the current picture. RefPicSetStCurrAfter consists of all short-term reference pictures that are prior to the current picture in decoding order, that succeed the current picture in output order, and that may be used in inter prediction of the current picture. RefPicSetStFoll consists of all short-term reference pictures that may be used in inter prediction of one or more of the pictures following the current picture in decoding order, and that are not used in inter prediction of the current picture. RefPicSetLtCurr consists of all long-term reference pictures that may be used in inter prediction of the current picture. RefPicSetLtFoll consists of all long-term reference pictures that may be used in inter prediction of one or more of the pictures following the current picture in decoding order, and that are not used in inter prediction of the current picture.

The RPS is signaled using up to three loops iterating over different types of reference pictures; short-term reference pictures with lower POC value than the current picture, short-term reference pictures with higher POC value than the current picture and long-term reference pictures. In addition, a flag (used_by_curr_pic_X_flag) is sent for each reference picture indicating whether the reference picture is used for reference by the current picture (included in one of the lists RefPicSetStCurrBefore, RefPicSetStCurrAfter or RefPicSetLtCurr) or not (included in one of the lists RefPicSetStFoll or RefPicSetLtFoll).

Figure 4:
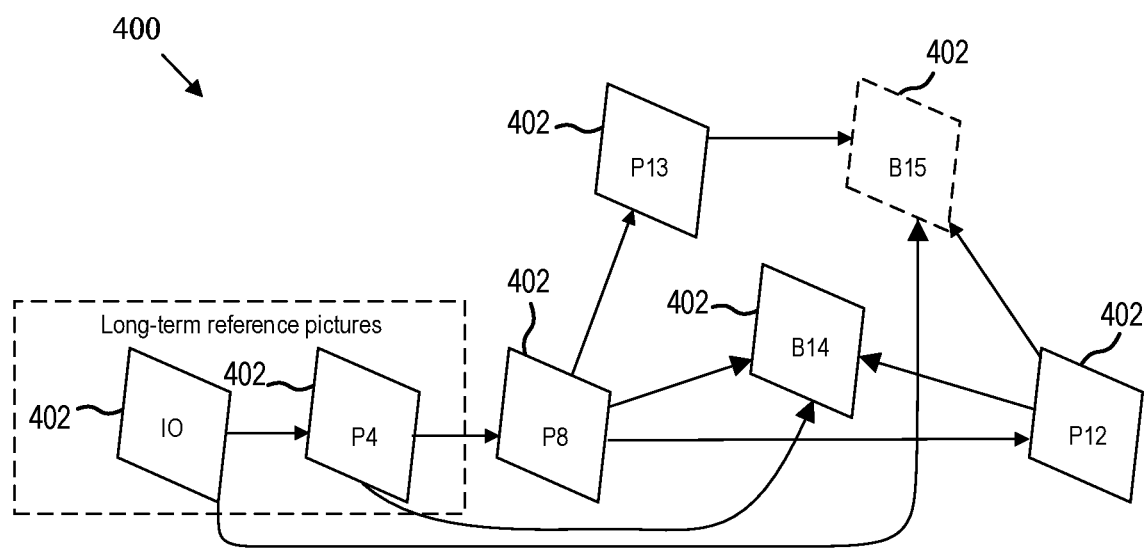
FIG. 4 is a schematic diagram illustrating a reference picture set (RPS) having a current picture with entries in all subsets of the RPS.

FIG. 4 illustrates an RPS 400 having a current picture B14 with entries (e.g., a picture) in all subsets 402 of the RPS 400. In the example in FIG. 4, the current picture B14 contains exactly one picture in each of the five subsets 402 (a.k.a., RPS subsets). P8 is the picture in the subset 402 referred to as RefPicSetStCurrBefore because the picture is before in output order and used by B14. P12 is the picture in the subset 402 referred to as RefPicSetStCurrAfter because the picture is after in output order and used by B14. P13 is the picture in the subset 402 referred to as RefPicSetStFoll because the picture is a short-term reference picture not used by B14 (but must be kept in the DPB since it is used by B15). P4 is the picture in the subset 402 referred to as RefPicSetLtCurr because the picture is a long-term reference picture used by B14. I0 is the picture in the subset 402 referred to as RefPicSetLtFoll since the picture is a long-term reference picture not used by the current picture (but must be kept in the DPB since it is used by B15).

The short-term part of the RPS 400 may be included directly in the slice header. Alternatively, the slice header may contain only a syntax element which represents an index, referencing to a predefined list of RPSs sent in the active SPS. The short-term part of the RPS 402 can be signaled using either of two different schemes; Inter RPS, as described below, or Intra RPS, as described here. When Intra RPS is used, num_negative_pics and num_positive_pics are signaled representing the length of two different lists of reference pictures. These lists contain the reference pictures with negative POC difference and positive POC difference compared to the current picture, respectively. Each element in these lists is encoded with a variable length code representing the difference in POC value relative to the previous element in the list minus one. For the first picture in each list, the signaling is relative to the POC value of the current picture minus one.

When encoding the recurring RPSs in the sequence parameter set, it is possible to encode the elements of one RPS (e.g., RPS 400) with reference to another RPS already encoded in the sequence parameter set. This is referred to as Inter RPS. There are no error robustness problems associated with this method as all the RPSs of the sequence parameter set are in the same network abstraction layer (NAL) unit. The Inter RPS syntax exploits the fact that the RPS of the current picture can be predicted from the RPS of a previously decoded picture. This is because all the reference pictures of the current picture must either be reference pictures of the previous picture or the previously decoded picture itself. It is only necessary to indicate which of these pictures should be reference pictures and be used for the prediction of the current picture. Therefore, the syntax comprises the following: an index pointing to the RPS to use as a predictor, a delta_POC to be added to the delta_POC of the predictor to obtain the delta POC of the current RPS, and a set of indicators to indicate which pictures are reference pictures and whether they are only used for the prediction of future pictures. In an embodiment, delta POC refers to the difference in POC value between a current reference picture and another (e.g., previous) reference picture.

Encoders that would like to exploit the use of long-term reference pictures must set the SPS syntax element long_term_ref_pics_present_flag to one. Long-term reference pictures can then be signaled in the slice header by fixed-length codewords, poc_lsb_lt, representing the least significant bits of the full POC value of each long-term picture. Each poc_lsb_lt is a copy of the pic_order_cnt_lsb codeword that was signaled for a particular long-term picture. It is also possible to signal a set of long-term pictures in the SPS as a list of POC LSB values. The POC LSB for a long-term picture can then be signaled in the slice header as an index to this list.

The delta_poc_msb_cycle_lt_minus1 syntax element can additionally be signaled to enable the calculation of the full POC distance of a long-term reference picture relative to the current picture. It is required that the codeword delta_poc_msb_cycle_lt_minus1 is signaled for each long-term reference picture that has the same POC LSB value as any other reference picture in the RPS.

The reference picture marking in HEVC is discussed.

Before picture decoding, there will typically be a number of pictures present in the DPB. Some of the pictures may be available for prediction and thus marked as "used for reference." Other pictures may be unavailable for prediction but waiting for output, thus marked as "unused for reference." When the slice header has been parsed, a picture marking process is carried out before the slice data is decoded. Pictures that are present in the DPB and marked as "used for reference" but are not included in the RPS are marked "unused for reference." Pictures that are not present in the DPB but are included in the reference picture set are ignored when the used_by_curr_pic_X_flag is equal to zero. However, when the used_by_curr_pic_X_flag instead is equal to one, this reference picture was intended to be used for prediction in the current picture but is missing. Then an unintentional picture loss is inferred and the decoder should take appropriate actions.

After decoding the current picture, it is marked "used for short-term reference".

The reference picture list construction in HEVC is discussed.

In HEVC, the term inter prediction is used to denote prediction derived from data elements (e.g., sample values or motion vectors) of reference pictures other than the current decoded picture. Like in AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1, are used for B slices. Similar to AVC, the reference picture list construction in HEVC includes reference picture list initialization and reference picture list modification.

In AVC, the initialization process for List 0 is different for P slice (for which decoding order is used) and B slices (for which output order is used). In HEVC, output order is used in both cases.

Reference picture list initialization creates default List 0 and List 1 (if the slice is a B slice) based on three RPS subsets: RefPicSetStCurrBefore, RefPicSetStCurrAfter, and RefPicSetLtCurr. Short-term pictures with earlier (later) output order are firstly inserted into the List 0 (List 1) in ascending order of POC distance to the current picture, then short-term pictures with later (earlier) output order are inserted into the List 0 (List 1) in ascending order of POC distance to the current picture, and finally the long-term pictures are inserted at the end. In terms of RPS, for List 0, the entries in RefPicSetStCurrBefore are inserted in the initial list, followed by the entries in RefPicSetStCurrAfter. Afterwards, the entries in RefPicSetLtCurr, if available, are appended.

In HEVC, the above process is repeated (reference pictures that have already been added to the reference picture list are added again) when the number of entries in a list is smaller than the target number of active reference pictures (signaled in the picture parameter set or slice header). When the number of entries is larger than the target number the list is truncated.

After a reference picture list has been initialized, the reference picture may be modified such that the reference pictures for the current picture may be arranged in any order, including the case where one particular reference picture may appear in more than one position in the list, based on the reference picture list modification commands. When the flag that indicates whether the presence of list modifications is set to one, a fixed number (equal to the target number of entries in the reference picture list) of commands are signaled, and each command inserts one entry for a reference picture list. A reference picture is identified in the command by the index to the list of reference pictures for the current picture derived from the RPS signaling. This is different from reference picture list modification in H.264/AVC, wherein a picture is identified either by the picture number (derived from the frame_num syntax element) or the long-term reference picture index, and it is possible that fewer commands are needed, e.g., for swapping the first two entries of an initial list or inserting one entry at the beginning of the initial list and shifting the others.

A reference picture list is not allowed to include any reference picture with Temporand greater than the current picture. An HEVC bitstream might consist of several temporal sub-layers. Each NAL unit belongs to a specific sub-layer as indicated by the Temporand (equal to temporal_id_plus1−1).

The reference picture management directly based on reference picture lists is discussed.

The JCT-VC document JCTVC-G643, publicly available at http://phenix.int-evry.fr/jct/doc_end_user/documents/7_Geneva/wg11/JCTVC-G643-v3.zip, includes an approach to directly use three reference picture lists, reference picture list 0, reference picture list 1, as well as an idle reference picture list for management of the reference pictures in the DPB. This approach avoids the need to utilize either 1) the sliding window and the MMCO processes as well as the reference picture list initialization and modification processes in AVC, or 2) the reference picture set as well as the reference picture list initialization and modification processes in HEVC, which simplifies signaling and decoding.

The JVET document JVET-L0112, publicly available at http://phenix.it-sudparis.eu/jvet/doc_end_user/documents/12_Macao/wg11/JVET-L0112-v4.zip, describes another approach for reference picture management directly based on reference picture lists. Instead of using three reference picture lists like proposed in JCTVC-G643, the approach proposed in JVET-L0112 uses only two reference picture lists: reference picture list 0 and reference picture list 1. Each reference picture list contains information associated with reference pictures for constructing an associated final reference picture list (e.g., reference pictures in reference picture list 0 are for constructing final reference picture list 0 and reference pictures in reference picture list 1 are for constructing final reference picture list 1). Each reference picture list may contain reference pictures that are not active (e.g., not needed for the current picture but may be needed for future pictures).

Picture partitioning schemes in HEVC are discussed.

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slice based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTB s, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied. Thus, WPP is not a tool for MTU size matching. However, if MTU size matching is required, regular slices can be used with WPP, with certain coding overhead.

Tiles define horizontal and vertical boundaries that partition a picture into tile columns and rows. The scan order of CTBs is changed to be local within a tile (in the order of a CTB raster scan of a tile) before decoding the top-left CTB of the next tile in the order of tile raster scan of a picture. Similar to regular slices, tiles break in-picture prediction dependencies as well as entropy decoding dependencies. However, the tiles do not need to be included in individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and to loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

Motion-constrained tile sets (MTCSs) are discussed.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publically available herein: http://phenix.int-evry.fr/jct/doc_end_user/documents/29_Macau/wg11/JCTVC-AC1005-v2.zip. With this amendment included, HEVC specifies three MCTS-related supplemental enhancement information (SEI) messages, namely temporal MCTSs SEI message, MCTSs extraction information set SEI message, and MCTSs extraction information nesting SEI message.

The temporal MCTSs SEI message indicates the existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information includes a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

Tile groups are discussed.

After the 12th JVET meeting in Macao in October 2018, it was agreed to replace the concept of the slice with the tile group. However, at the time of this disclosure, the latest draft of VVC had not included the agreed tile group concept yet. Contribution JVET-L0686, which is publicly available at http://phenix.it-sudparis.eu/jvet/doc_end_user/documents/12_Macao/wg11/JVET-L0686-v2.zip, contains the text of the agreed tile group. The agreed tile group from the 12th JVET meeting allows grouping of one or more tile into a tile group. The tiles that belong to the tile group are consecutive in raster scan order of the picture. For the rest of this disclosure, the tile group described in JVET-L0686 is referred to as raster-scan tile group.

Contribution JVET-L0114, which is publicly available at http://phenix.it-sudparis.eu/jvet/doc_end_user/documents/12_Macao/wg11/JVET-L0114-v1.zip, describes another approach for the tile group. The tile group described herein is constrained such that the tiles that are grouped together into a picture shall form a rectangular shape of area within a picture. For the rest of this disclosure, the tile group described in JVET-L0114 is referred to as rectangular tile group.

The viewport dependent use-case in 360° video application is discussed.

Three hundred and sixty degree (360°) video applications display only part of the whole sphere (and consequently only a sub-set of an entire picture). To reduce bitrate, a use-case scenario called viewport-dependent 360° delivery over DASH is used to deliver 360° video over DASH. The use-case scenario is as follows.

Divide the whole sphere/projected picture (e.g., using the cubemap projection (CMP)) into multiple MCTSs.

Encode two or more bitstreams with different spatial resolutions or qualities.

When delivering to the decoder, the MCTS(s) from a higher resolution/quality bitstream is used to display the viewport (e.g., the front viewport), and the MCTSs from lower resolution/quality bitstreams are used to display the rest. These MCTSs are packed in a certain way and then sent to the receiver to be decoded.

The expectation is that the viewport seen by the user is represented by a high resolution/quality MCTS to provide a good viewing experience. When the user turns their head to see another viewport (e.g., the left or right viewport), the displayed content will come from the lower resolution/quality viewport for a short period while the system is fetching the high resolution/quality MCTSs for that viewport.

When the user turns their head to see another viewport, there is a delay between the time when the user turns their head and the time when a higher resolution/quality representation of the viewport is seen. This delay depends on how fast the system can fetch the higher resolution/quality MCTSs for that viewport, which in turn depends on the IRAP period (e.g., the interval between the occurrence of two IRAPs) because the MCTSs of the new viewport can only be decodable starting from an TRAP picture. If the IRAP period is coded every is then the following applies:

The best case scenario for the delay is the same as the network round-trip delay if the user turns their head to see the new viewport just before the system starts fetching the new segment/IRAP period. In this scenario, the system would be able request the higher resolution/quality MCTSs for the new viewport right away. As such, the only delay is the network round-trip delay (the delay of the fetching request plus the transmission time of the requested MCTSs, assuming that the minimum buffering delay can be set to zero, although usually in a streaming system that cannot be set equal to 0, and the sensor delay is small and negligible). The network round-trip delay can be around 200 milliseconds (ms), for example.

The worst case scenario for the delay is the TRAP period+network round-trip delay if the user turns their head to see the new viewport just after the system already made a request for the next segment.

To improve the worst case scenario above, one can encode the bitstreams with more frequent IRAP pictures so that the TRAP period is shorter, thus reducing the overall delay. However, this consequently increases the bandwidth requirement as the compression efficiency will be lowered.

The problems of the existing IRAP concept are discussed.

Up to HEVC and the latest development of VVC, an TRAP concept is a picture level concept. That means that the smallest object in a coded video bitstream associated with intra random access point is a picture. It would be beneficial if the IRAP concept was applicable at a sub-picture level. Having TRAP at sub-picture level would help reduce the worst case scenario, as described above, in the 360° delivery over DASH. However, it is difficult to improve the TRAP concept in this manner with the existing video coding specifications (e.g., HEVC, VVC, etc.) due to the following issues.

In general, the signaling, derivation process, and decoding process for an TRAP picture differs from those for a non-TRAP picture. In addition, many aspects are defined at the picture level. Some of the differences are as follows.

With regard to POC derivation, the POC MSB is always set to 0 for IDR pictures, whereas the POC MSB is derived from the previous key picture for other picture types.

With regard to reference picture management, no information needs to be signaled for IDR pictures when the IDR picture is received. The decoder simply marks all reference pictures in the DPB as "unused for reference." On the other hand, for other picture types, information for assisting reference picture management (e.g., RPS, RPL, etc.) needs to be signaled.

A sub-picture may be extracted out of the original bitstream to form a new bitstream via a sub-bitstream extraction process. It is desirable that the signaling, derivation, and decoding process of the same sub-picture before and after the sub-bitstream extraction process do not change and produce the same decoding/reconstruction result.

One of the drawbacks of current coding techniques involves TRAP pictures. IRAP pictures are intra coded. As such, a coder/decoder (a.k.a., codec) codes TRAP pictures without utilizing a reference picture list (RPL). As a result, the syntax used in current coding techniques instructs the codec not to look for an RPL any time an IRAP picture is encountered.

In virtual reality (VR) coding, it may be desirable to divide a picture into sub-pictures, where one sub-picture is an IRAP sub-picture and the other sub-picture is a non-RAP sub-picture. When a picture has been divided in this manner, the picture may be referred to as a mixed TRAP picture. However, mixed TRAP pictures present a problem for current coding techniques. Indeed, the current syntax requires the codec to ignore any RPL for the entire mixed TRAP picture due to the presence of the RAP sub-picture. Because the RPL is ignored, the codec is unable to code the non-IRAP sub-picture which, as an inter coded picture, relies on the RPL for proper coding.

Disclosed herein are video coding techniques that permit TRAP pictures, and specifically mixed TRAP pictures, to reference and utilize the RPL. Therefore, even though the mixed TRAP picture contains an RAP sub-picture, the codec is permitted to reference and utilize the RPL to code the non-TRAP sub-picture. This is particularly beneficial in VR coding applications, although the concept may be applied in other areas as well.

Figure 5:
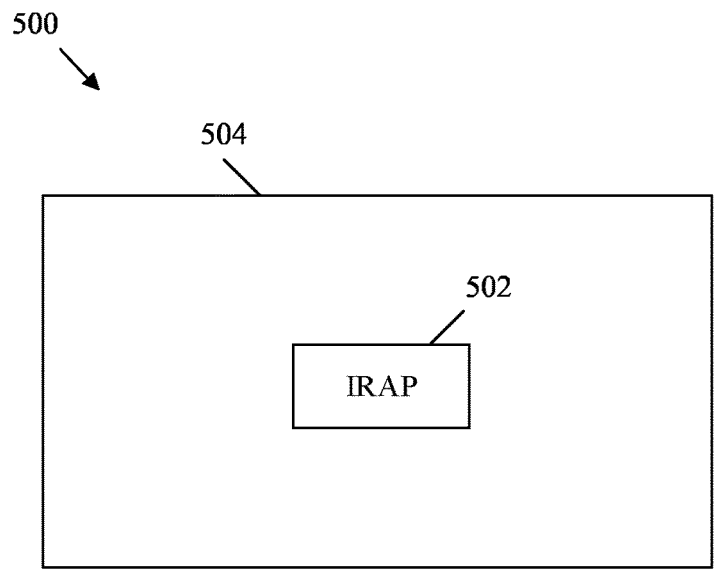
FIG. 5 is a schematic diagram of an embodiment of a picture suitable for use with VR coding applications.

FIG. 5 is a schematic diagram of an embodiment of a picture 500 suitable for use with VR coding applications. As shown, the picture 500 has been divided into a first sub-picture 502 and a second sub-picture 504. In an embodiment, the first sub-picture 502 corresponds to a viewport used in VR applications. A viewport is the portion of the picture currently being viewed by a user of the VR application or program. In an embodiment, the second sub-picture 504 comprises the remaining portion of the picture 500. That is, the second sub-picture 504 is the portion of the picture 500 outside the viewport. In an embodiment, the first sub-picture 502 is an TRAP picture and the second sub-picture 504 is a non-RAP picture at a particular point in time, t, in the bitstream. As such, the picture 500 may be referred to as a mixed TRAP picture at time t.

Figure 6:
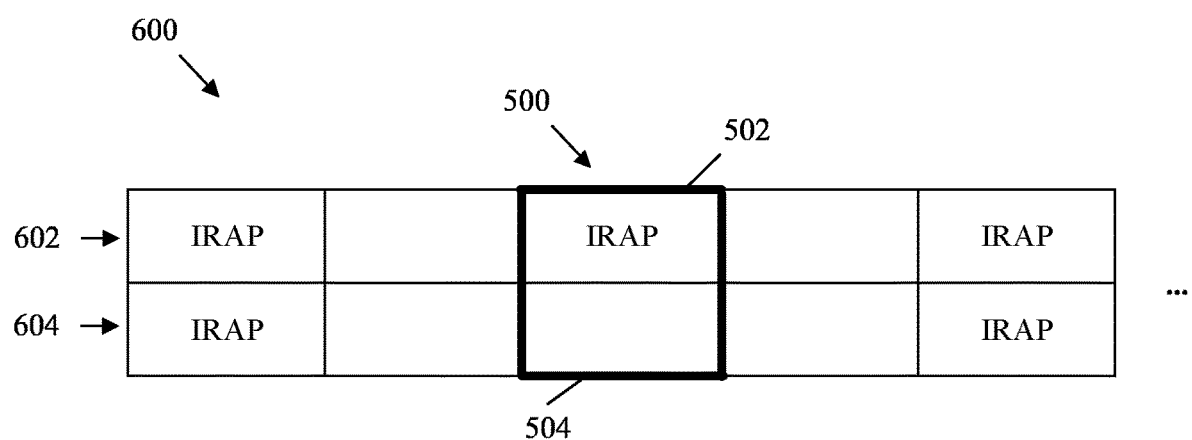
FIG. 6 is a schematic diagram of an embodiment of a video bitstream corresponding to the picture of FIG. 5.

FIG. 6 is a schematic diagram of an embodiment of a video bitstream 600 corresponding to the picture 500 of FIG. 5. As used herein, the video bitstream 600 may also be referred to as a coded video bitstream, a bitstream, or variations thereof. The picture 500 in FIG. 6 may be contained within a single NAL unit (represented by the bolded black rectangle) or contained within several NAL units.

As shown in FIG. 6, the bitstream 600 has been divided into a first sub-bitstream 602 and a second sub-bitstream 604. The first sub-bitstream 602 corresponds to the first sub-picture 502 and the second sub-bitstream 604 corresponds to the second sub-picture 504. Because the first sub-bitstream 602 corresponds to first sub-picture 502, which is the viewport in this example, the first sub-bitstream 602 includes more TRAP sub-pictures than the second sub-bitstream 604. An TRAP picture permits a codec to start decoding at that location in the bitstream 600. Because the first sub-stream 602 includes several TRAP pictures, the decoder can start decoding the first sub-picture 502 at a variety of different locations. Examples of TRAP pictures include instantaneous decoder refresh (IDR) pictures, clean random access (CRA) pictures, and broken link access (BLA) pictures.

According to the embodiments disclosed herein, when a decoder (e.g., video decoder 30) encounters a picture 500 in the bitstream 600 during the decoding process, the decoder is no longer instructed to ignore any RPL for the entire mixed RAP picture (e.g., picture 500) due to the presence of the TRAP sub-picture (e.g., the first sub-picture 502). Therefore, even though the mixed TRAP picture contains an TRAP sub-picture, the decoder is permitted to reference and utilize the RPL in order to decode the non-TRAP sub-picture (e.g., the second sub-picture 504). That is, TRAP pictures, and specifically mixed TRAP pictures, are permitted to reference and utilize the RPL. Because of this, mixed RAP pictures, which are beneficial in VR applications, are possible.

In an embodiment, a flag may be signaled by an encoder (e.g., video encoder 20) to indicate to a decoder (e.g., video decoder 30) whether the bitstream (e.g., bitstream 600) contains any of the mixed TRAP pictures (e.g., picture 500). The flag may be signaled in a sequence parameter set (SPS), a picture parameter set (PPS), or in another parameter set of the bitstream. In an embodiment, the flag is designated sps_mixed_tile_groups_in_pic_flag.

In an embodiment, the first sub-picture 502 and the second sub-picture 504 may be referred to as a tile group. In an embodiment, the RPL is constructed at the beginning of the decoding of each tile group regardless of NAL unit type for that tile group. The RPL may comprise, for example, RefPicList[0] and RefPicList[1] for an RPL approach or RefPicList0[ ] and RefPicList1[ ] for a reference picture set (RPS) approach. Similar lists containing reference pictures for the inter-prediction operation may also be utilized.

Figure 7:
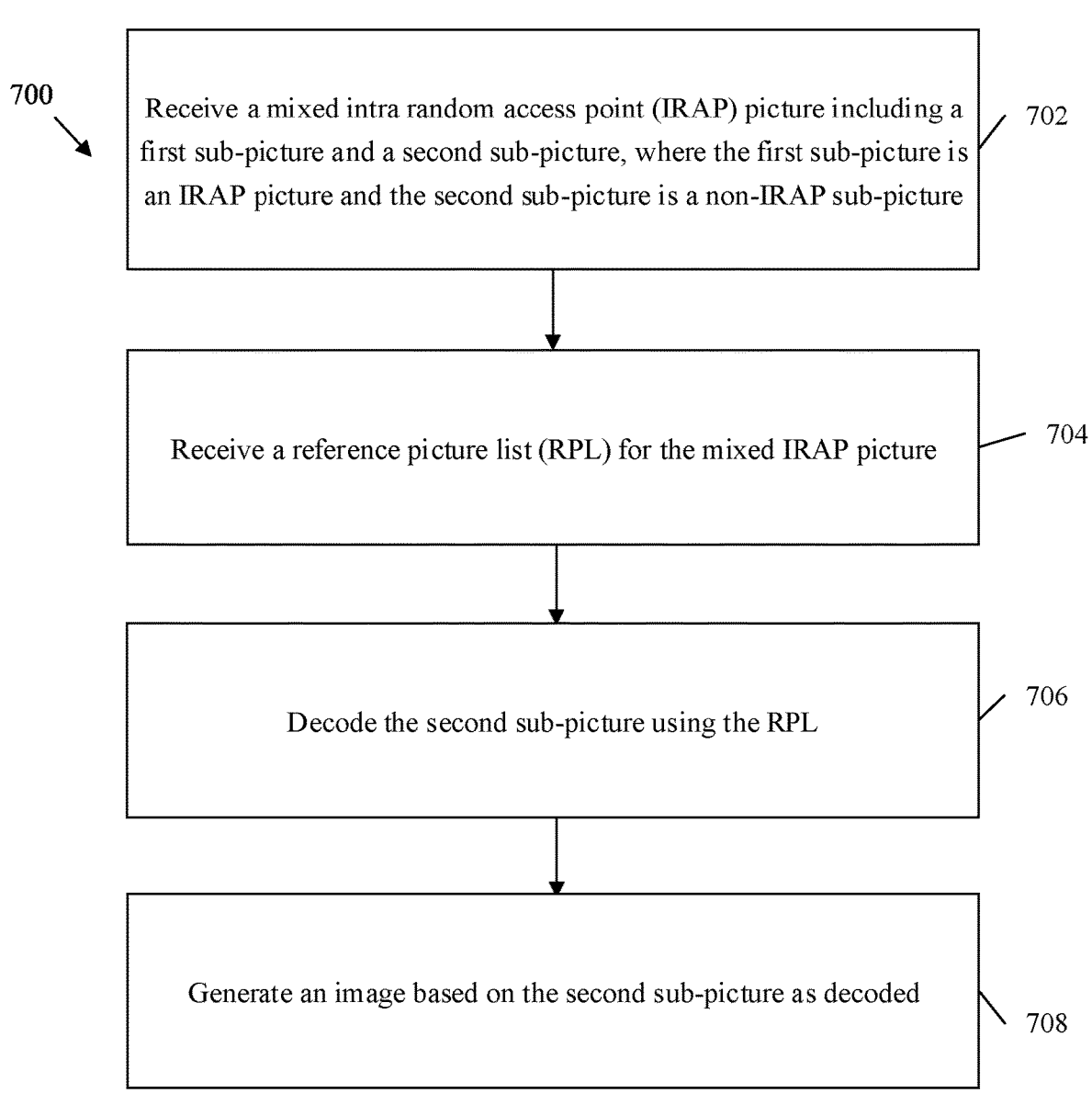
FIG. 7 is an embodiment of a method of decoding a coded video bitstream.

FIG. 7 is an embodiment of a method 700 of decoding a coded video bitstream (e.g., bitstream 600) implemented by a video decoder (e.g., video decoder 30). The method 700 may be performed after the decoded bitstream has been directly or indirectly received from a video encoder (e.g., video encoder 20). The method 700 improves the decoding process (e.g., makes the decoding process more efficient, faster, etc., than conventional decoding processes) because IRAP pictures, and specifically mixed TRAP pictures, are permitted to reference and utilize an RPL. Because of this, mixed TRAP pictures, which are beneficial in VR applications, are possible. Therefore, as a practical matter, the performance of a codec is improved, which leads to a better user experience.

In block 702, the video decoder receives a mixed intra random access point (TRAP) picture (e.g., picture 500) including a first sub-picture (e.g., sub-picture 502) and a second sub-picture (e.g., sub-picture 504). In an embodiment, the first sub-picture is an TRAP picture and the second sub-picture is a non-TRAP sub-picture. In an embodiment, the mixed TRAP picture is received in a divided bitstream containing a first sub-bitstream (e.g., first sub-bitstream 602) and a second sub-bitstream (e.g., second sub-bitstream 604). In an embodiment, the TRAP picture is an instantaneous decoder refresh (IDR) picture. In an embodiment, the mixed TRAP picture is contained in a single Network Access Layer (NAL) unit.

In block 704, the video decoder receives a reference picture list (RPL) for the mixed TRAP picture. The RPL is received or otherwise obtained by the video decoder despite the mixed TRAP picture containing at least one TRAP picture.

In block 706, the video decoder decodes the second sub-picture using the RPL. In block 708, the video decoder generates an image based on the second sub-picture as decoded. In an embodiment, the image may be displayed to a user on the display or screen of an electronic device (e.g., a smart phone, tablet, laptop, personal computer, etc.).

In an embodiment, the method 700 further comprises receiving a flag in the bitstream. The flag indicates whether the bitstream contains a mixed TRAP picture. In an embodiment, the flag is signaled in the SPS, the PPS, or another portion of the bitstream.

Figure 8:
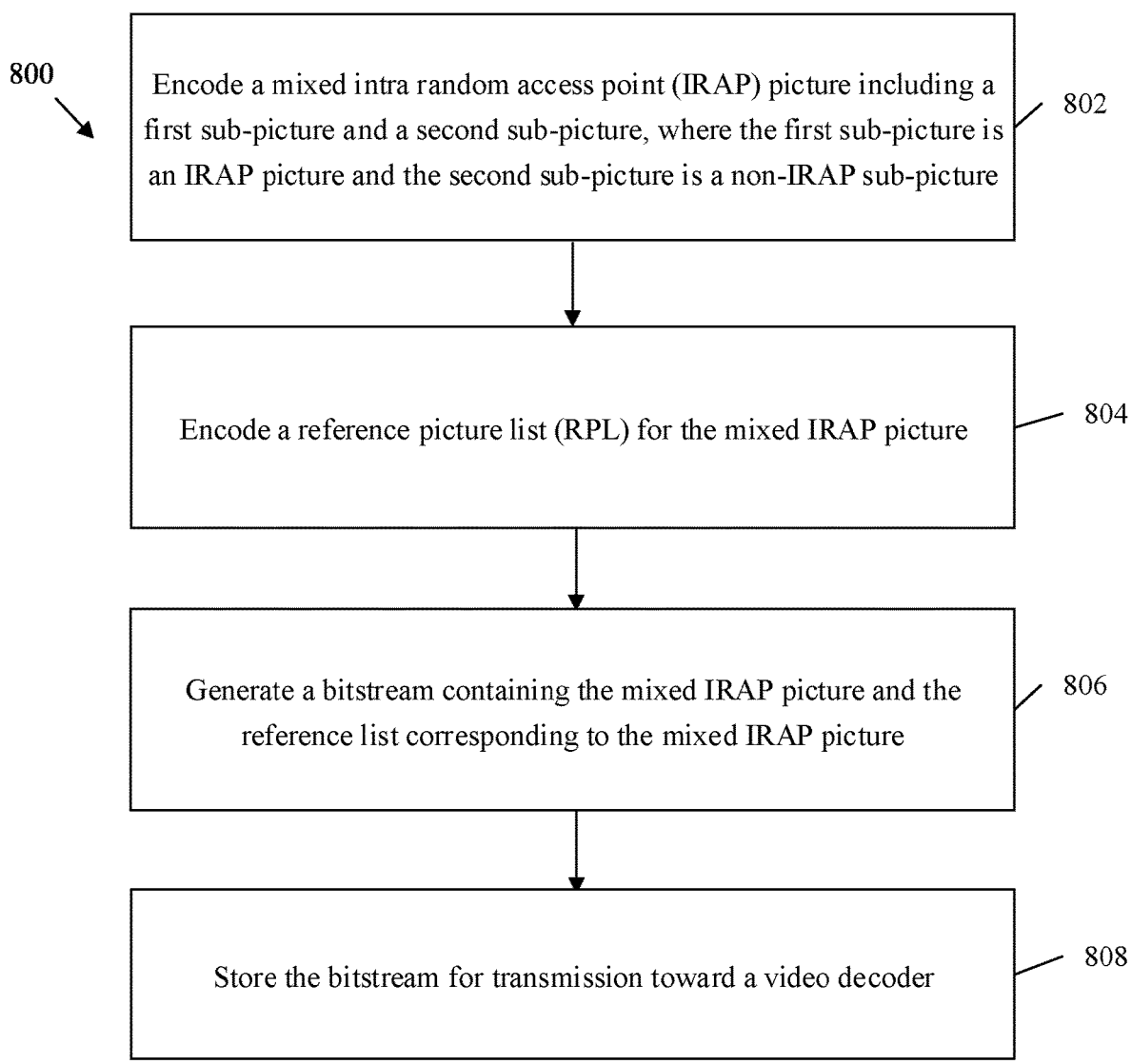
FIG. 8 is an embodiment of a method of encoding a video bitstream.

FIG. 8 is an embodiment of a method 800 of encoding a video bitstream (e.g., bitstream 500) implemented by a video encoder (e.g., video encoder 20). The method 800 may be performed when a picture (e.g., from a video) is to be encoded into a video bitstream and then transmitted toward a video decoder (e.g., video decoder 30). The method 800 improves the encoding process (e.g., makes the encoding process more efficient, faster, etc., than conventional encoding processes) because TRAP pictures, and specifically mixed TRAP pictures, are permitted to reference and utilize an RPL. Because of this, mixed IRAP pictures, which are beneficial in VR applications, are possible. Therefore, as a practical matter, the performance of a codec is improved, which leads to a better user experience.

In block 802, the video encoder encodes a mixed intra random access point (IRAP) picture including a first sub-picture and a second sub-picture, wherein the first sub-picture is an IRAP picture and the second sub-picture is a non-IRAP sub-picture. In an embodiment, the mixed IRAP picture is encoded into a divided bitstream containing a first sub-bitstream and a second sub-bitstream. In an embodiment, the first sub-picture is encoded in a first sub-bitstream and the second sub-picture is encoded in a second sub-bitstream. In an embodiment, the IRAP picture is an instantaneous decoder refresh (IDR) picture. In an embodiment, the mixed IRAP picture is encoded in a single Network Access Layer (NAL) unit.

In block 804, the video encoder encodes a reference picture list (RPL) for the mixed IRAP picture.

In block 806, the video encoder generates a bitstream containing the mixed IRAP picture and the RPL corresponding to the mixed IRAP picture. The video encoder encodes the RPL in the bitstream despite the mixed IRAP picture containing at least one IRAP picture.

In block 808, the video encoder stores the bitstream for transmission toward a video decoder. The bitstream may be stored in memory, at least temporarily, until the video encoder transmits the video bitstream (e.g., bitstream 600) toward a video decoder. Once received by the video decoder, the encoded video bitstream may be decoded (e.g., as described above) to generate or produce an image for display to a user on the display or screen of an electronic device (e.g., a smart phone, tablet, laptop, personal computer, etc.).

In an embodiment, the method 800 further comprises encoding a flag in the bitstream. The flag indicates whether the bitstream contains a mixed IRAP picture. In an embodiment, the flag is signaled in the SPS, the PPS, or another portion of the bitstream.

A description of the techniques disclosed herein is provided relative to the latest approach in JVET-L0686-v2 and JVET-L0112-v2. Changed parts relative to the approach in JVET-L0686-v2 and JVET-L0112-v2 are in italics and shown in bold for removal, while the texts for the approach in JVET-L0686-v2 and JVET-L0112-v2 that are not mentioned below apply as they are.

The following definitions are provided.

instantaneous decoding refresh (IDR) tile group: A tile group contained in a VCL NAL unit with nal_unit_type equal to IDR_NUT.

intra random access point (IRAP) tile group: A tile group contained in a VCL NAL unit with nal_unit_type equal to IDR_NUT or CRA_NUT.

intra random access point (IRAP) picture: A coded picture for which each VCL NAL unit has nal_unit_type of IDR_NUT or CRA_NUT.

NOTE—The value of FirstIrapPictureFlag is equal to 1 for each IDR or CRA access unit that is the first access unit in a CVS in decoding order. When the value of FirstIrapPictureFlag is equal to 1, the value of NoRaslOutputFlag is set to be equal to 1. An IDR picture is always the first access unit in a CVS. A CRA access unit is the first access unit in a CVS if it is the first picture in the bitstream, it immediately follows an end of sequence NAL unit, or it has the associated variable HandleCraAsFirstPicInCvsFlag equal to 1. The variable HandleCraAsFirstPicInCvsFlag may be set by an external means.

non-IRAP tile group: A tile group contained in a VCL NAL unit with nal_unit_type neither equal to IDR_NUT nor equal to CRA_NUT.

NAL unit header semantics are provided.

TABLE 7

| | 1 - NAL unit type codes and NAL unit type classes | | |
|---|---|---|---|
| nal_unit_type | Name of nal_unit_type | Content of NAL unit and RBSP syntax structure | NAL unit type class |
| 0 | NON_IRAP_NUT | Coded tile group of a non-IRAP type tile_group_layer_rbsp( ) | VCL |
| 1 | IDR_NUT | Coded tile group of an IDR type tile_group_layer_rbsp( ) | VCL |
| 2 | CRA_NUT | Coded tile group of a CRA type tile_group_layer_rbsp( ) | VCL |
| 3-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

When each tile group of a picture has nal_unit_type equal to IDR_NUT or CRA_NUT, i.e., the current tile group belongs to an IRAP picture, TemporalId shall be equal to 0.

When nal_unit_type of a VCL NAL unit is neither equal to IDR_NUT nor equal to CRA_NUT while there is at least one other VCL NAL unit of the same picture has nal_unit_type equal to equal to IDR_NUT or CRA_NUT, TemporalId shall be equal to 0.

Sequence parameter set syntax and semantics are provided.

| | Descriptor |
|---|---|
| seq_parameter_set_rbsp( ) { | |
| ... | |
|   sps_mixed_tile_groups_in_pic_flag | u(1) |
| ... | |
|   long_term_ref_pics_flag | u(1) |
|   if( long_term_ref_pics_flag ) | |
|     additional_lt_poc_lsb | ue(v) |
|   rpl1_same_as_rpl0_flag | u(1) |
|   for( i = 0; i < !rpl1_same_as_rpl0_flag ? 2: 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j, long_term_ref_pics_flag ) | |
|   } | |
| ... | |
| } | | sps_mixed_tile_groups_in_pic_flag equal to 1 specifies that there may be pictures in the CVS that have both IRAP tile groups and non-IRAP tile groups. sps_mixed_tile_groups_in_pic_flag equal to 0 specifies that there each picture in the CVS has either IRAP tile groups only or non-IRAP tile groups only.

Picture parameter set syntax is discussed.

| | Descriptor |
|---|---|
| pic_parameter_set_rbsp( ) { | |
| ... | |
|   for( i = 0; i < 2; i++) | |
|     num_ref_idx_default_active_minus1[ i ] | ue(v) |
|   rpl1_idx_present_flag | u(1) |
| ... | |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_file_spacing_flag | u(1) |
|     if( !uniform_tile_spacing_flag ) { | |
|       for( i = 0; i <num_tile_columns_minus1; i++ ) | |
|         tile_column_width_minus1[ i ] | ue(v) |
|       for( i = 0; i <num_tile_rows_minus1; i++ ) | |
|         tile_row_height_minus1 [ i ] | ue(v) |
|     } | |
|     loop_filter_across_tiles_enabled_flag | u(1) |
|   } | |
|   rbsp_trailing_bits( ) | |
| } | |

Tile group syntax is discussed.

| | Descriptor |
|---|---|
| tile_group_header( ) { | |
|   tile_group_pic_parameter_set_id | ue(v) |
|   if( NumTilesInPic > 1 ) { | |
|     tile_group_address | u(v) |
|     num_tiles_in_tile_group_minus1 | ue(v) |
|   } | |
|   tile_group_type | ue(v) |
|   *if(nal_unit_type = = IDR_NUT)* | |
|     *poc_msb_reset_flag* | *u(1)* |
|   *slice_pic_order_cnt_lsb* | *u(v)* |
|   if( nal_unit_type != IRAP_NUT){ | |
|     slice_pic_order_cnt_lsb | u(v) |
|   for( i = 0; i < 2; i++ ) { | |
|     if( i == 0 \|\| ( i == 1 && rpl1_idx_present_flag ) ) | |
|       ref_pic_list_sps_flag[ i ] | u(1) |
|     if( ref_pic_list_sps_flag[ i ] ) { | |
|       if( num_ref_pic_lists_in_sps[ i ] > 1 ) | |
|         if( i == 0 \|\| ( i == 1 && rpl1_idx_present_flag ) ) | |
|           ref_pic_list_idx[ i ] | u(v) |
|     } else | |
|       ref_pic_list_struct( i, num_ref_pic_lists_in_sps[ i ], | |
|         long_term_ref_pics_flag ) | |
|   } | |
|   if( slice_type == P \|\| slice_type == B ) { | |
|     num_ref_idx_active_override_flag | u(1) |
|     if( num_ref_idx_active_override_flag ) | |
|       for( i = 0; i < ( slice_type == B ? 2: 1 ); i++ ) | |
|         num_ref_idx_active_minus1[ i ] | ue(v) |
|     } | |
|   } | |
|   ... | |
| } | | poc_msb_reset_flag is used to specify the variable PicRefreshFlag as follows:

If the current tile group belongs to the first access unit in the bitstream in decoding order, PicRefreshFlag is set equal to 1.

Otherwise if the current tile group is an IDR tile group, PicRefreshFlag is set equal to sps_mixed_tile_groups_in_pic_flag?poc_msb_reset_flag:1.

Otherwise if the current tile group is a CRA tile group, the following applies:

If the current access unit immediately follows an end of sequence NAL unit, or the associated variable HandleCraAsFirstPicInCvsFlag is equal to 1, PicRefreshFlag is set equal to 1.

Otherwise, PicRefreshFlag is set equal to 0.

Otherwise (the current tile group does not belong to the first access unit in the bitstream in decoding order and it is not an TRAP tile group), PicRefreshFlag is set equal to 0.

Note that when sps_mixed_tile_groups_in_pic_flag is equal to 0, the value of poc_msb_reset_flag is ignored.

When sps_mixed_tile_groups_in_pic_flag is equal to 1, it is a requirement of bitstream conformance that the following constraints apply:

When all tile groups of the current picture are IDR tile groups, the value of poc_msb_reset_flag shall be equal to 1 for all the IDR tile groups of the current picture.

When the current picture contains an IDR tile group and at least one tile group that is not an IDR tile group, the value of poc_msb_reset_flag shall be equal to 0.

NOTE—The value of poc_msb_reset_flag equal to 1 indicates that if the current picture has more than one tile group, all the tile groups are IDR tile groups.

NOTE—When an MCTS is extracted to be a sub-bitstream from an original bitstream with sps_mixed_tile_groups_in_pic_flag equal to 1, the value of sps_mixed_tile_groups_in_pic_flag in the active SPSs for the extracted sub-bitstream has to be set equal to 0, i.e., in the extracted sub-bitstream each picture has to has either TRAP tile groups only or non-TRAP tile groups only. In other words, it is required that tile groups that belong to one picture and belong to one MCTS must have the same NAL unit type.

Tile group decoding process is discussed.

The decoding process operates as follows for the current picture CurrPic:

1. The decoding of NAL units is specified in clause for NAL unit decoding process below.
2. The processes in clause for tile group decoding process specify the following decoding processes using syntax elements in the tile group header layer and above:

Variables and functions relating to picture order count are derived as specified in clause for decoding process for picture order count below. This needs to be invoked only for the first tile group of a picture.

At the beginning of the decoding process for each tile group of a non-IDR picture, the decoding process for reference picture lists construction is invoked for derivation of reference picture list 0 (RefPicList[0]) and reference picture list 1 (RefPicList[1]).

The decoding process for reference picture marking is invoked, wherein reference pictures may be marked as "unused for reference" or "used for long-term reference." This needs to be invoked only for the first tile group of a picture.

3. Invoke the decoding processes for coding tree units, scaling, transform, in-loop filtering, etc.
4. After all slices of the current picture have been decoded, the current decoded picture is marked as "used for short-term reference."

The NAL unit decoding process is discussed.

Inputs to this process are NAL units of the current picture and their associated non-VCL NAL units.

Outputs of this process are the parsed RBSP syntax structures encapsulated within the NAL units.

The decoding process for each NAL unit extracts the RBSP syntax structure from the NAL unit and then parses the RBSP syntax structure.

The tile group decoding process is discussed.

The decoding process for picture order count is provided.

Output of this process is PicOrderCntVal, the picture order count of the current picture.

Picture order counts are used to identify pictures, for deriving motion parameters in merge mode and motion vector prediction, and for decoder conformance checking.

Each coded picture is associated with a picture order count variable, denoted as PicOrderCntVal.

When PicRefreshFlag is equal to 0, the current picture is not an IRAP picture, the variables prevPicOrderCntLsb and prevPicOrderCntMsb are derived as follows:

Let prevTid0Pic be the previous picture in decoding order that has Temporand equal to 0.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If PicRefreshFlag is equal to 1, the current picture is an IRAP picture, PicOrderCntMsb is set equal to 0.

Otherwise, PicOrderCntMsb is derived as follows:

```
if( ( slice_pic_order_cnt_lsb < prevPicOrderCntLsb ) &&
    ( ( prevPicOrderCntLsb - slice_pic_order_cnt_lsb ) >= (
MaxPicOrderCntLsb / 2 ) ) )
    PicOrderCntMsb = prevPicOrderCntMsb + MaxPicOrderCntLsb    (8 1)
else if( (slice_pic_order_cnt_lsb > prevPicOrderCntLsb ) &&
    ( ( slice_pic_order_cnt_lsb - prevPicOrderCntLsb ) > (
MaxPicOrderCntLsb / 2 ) ) )
    PicOrderCntMsb = prevPicOrderCntMsb - MaxPicOrderCntLsb
else
    PicOrderCntMsb = prevPicOrderCntMsb
PicOrderCntVal is derived as follows:
PicOrderCntVal = PicOrderCntMsb + slice_pic_order_cnt_lsb         (8-2)
```

NOTE 1—All IRAP pictures will have PicOrderCntVal equal to 0 since slice_pic_order_cnt_lsb is inferred to be 0 for IRAP pictures and prevPicOrderCntLsb and prevPicOrderCntMsb are both set equal to 0.

The value of PicOrderCntVal shall be in the range of $-2^{31}$ to $2^{31}-1$, inclusive. In one CVS, the PicOrderCntVal values for any two coded pictures shall not be the same.

At any moment during the decoding process, the values of PicOrderCntVal & (MaxLtPicOrderCntLsb−1) for any two reference pictures in the DPB shall not be the same.

The function PicOrderCnt(picX) is specified as follows:

PicOrderCnt(picX)=PicOrderCntVal of the picture picX (8-3)

The function DiffPicOrderCnt(picA, picB) is specified as follows:

DiffPicOrderCnt(picA,picB)=PicOrderCnt(picA)−PicOrderCnt(picB) (8-4)

The bitstream shall not contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

The decoding process for reference picture lists construction is provided.

This process is invoked at the beginning of the decoding process for each tile group of a non-IRAP picture.

Reference pictures are addressed through reference indices. A reference index is an index into a reference picture list. When decoding an I tile group, no reference picture list is used in decoding of the tile group data. When decoding a P tile group, only reference picture list 0 (i.e., RefPicList[0]), is used in decoding of the tile group data. When decoding a B tile group, both reference picture list 0 and reference picture list 1 (i.e., RefPicList[1]) are used in decoding of the tile group data.

At the beginning of the decoding process for each tile group, the reference picture lists RefPicList[0] and RefPicList[1] are derived. The reference picture lists are used in marking of reference pictures or in decoding of the tile group data.

NOTE 1—For an I tile group that is a non-IRAP tile group, RefPicList[0] and RefPicList[1] may be derived for bitstream conformance checking purpose, but their derivation is not necessary for decoding of the current picture or pictures following the current picture in decoding order. For a P tile group, RefPicList[1] may be derived for bitstream conformance checking purpose, but its derivation is not necessary for decoding of the current picture or pictures following the current picture in decoding order.

The reference picture lists RefPicList[0] and RefPicList[1] are constructed as follows:

```
for( i = 0; i < 2; i++ ) {
if( ref_pic_list_sps_flag[ i ] )
    RplsIdx[ i ] = ref_pic_list_idx[ i ]
else
    RplsIdx[ i ] = num_ref_pic_lists_in_sps[ i ]
for( j = 0, pocBase = PicOrderCntVal; j < NumEntriesInList[ i ][ RplsIdx[ i ] ]; j++) {
                                                                                    (8-5)
    if( !lt_ref_pic_flag[ i ][ RplsIdx[ i ] ][ j ] ) {
        RefPicPocList[ i ][ j ] = pocBase − DeltaPocSt[ i ][ RplsIdx[ i ] ][ j ]
```

```
        if( there is a reference picture picA in the DPB with PicOrderCntVal equal
to RefPicPocList[ i ][ j ] )
            RefPicList[ i ][ j ] = picA
        else
            RefPicList[ i ][ j ] = "no reference picture"
        pocBase = RefPicPocList[ i ][ j ]
    } else {
        if( there is a reference picA in the DPB with PicOrderCntVal & (
MaxLtPicOrderCntLsb − 1 )
            equal to poc_lsb_lt[ i ][ RplsIdx[ i ] ][ j ] )
            RefPicList[ i ][ j ] = picA
        else
            RefPicList[ i ][ j ] = "no reference picture"
    }
  }
}
```

For each i equal to 0 or 1, the following applies:

The first NumRefIdxActive[i] entries in RefPicList[i] are referred to as the active entries in RefPicList[i], and the other entries in RefPicList[i] are referred to as the inactive entries in RefPicList[i].

Each entry in RefPicList[i][j] for j in the range of 0 to NumEntriesInList[i][RplsIdx[i]]−1, inclusive, is referred to as an STRP entry if lt_ref_pic_flag[i][RplsIdx[i]][j] is equal to 0, and as an LTRP entry otherwise.

NOTE 2—It is possible that a particular picture is referred to by both an entry in RefPicList[0] and an entry in RefPicList[1]. It is also possible that a particular picture is referred to by more than one entry in RefPicList[0] or by more than one entry in RefPicList[1].

NOTE 3—The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order.

NOTE 4—There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture."

It is a requirement of bitstream conformance that the following constraints apply.

For each i equal to 0 or 1, NumEntriesInList[i][RplsIdx[i]] shall not be less than NumRefIdxActive[i].

The picture referred to by each active entry in RefPicList[0] or RefPicList[1] shall be present in the DPB and shall have Temporand less than or equal to that of the current picture.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] and all entries in RefPicList[1]. The number of pictures in setOfRefPics shall be less than or equal to sps_max_dec_pic_buffering_minus1 and setOfRefPics shall be the same for all slices of a picture.

The decoding process for reference picture marking is provided.

This process is invoked once per picture, after decoding of a tile group header and the decoding process for reference picture list construction for the tile group, but prior to the decoding of the tile group data. This process may result in one or more reference pictures in the DPB being marked as "unused for reference" or "used for long-term reference."

A decoded picture in the DPB can be marked as "unused for reference," "used for short-term reference," or "used for long-term reference," but only one among these three at any given moment during the operation of the decoding process. Assigning one of these markings to a picture implicitly removes another of these markings when applicable. When a picture is referred to as being marked as "used for reference," this collectively refers to the picture being marked as "used for short-term reference" or "used for long-term reference" (but not both).

When the current picture is an IRAP picture, all reference pictures currently in the DPB (if any) are marked as "unused for reference."

STRPs are identified by their PicOrderCntVal values. LTRPs are identified by the Log2(MaxLtPicOrderCntLsb) LSBs of their PicOrderCntVal values.

The following applies:

If PicRefreshFlag is equal to 1, all reference pictures in the DPB are marked as "unused for reference."

Otherwise (sps_mixed_tile_groups_in_pic_flag is equal to 1 or the current tile group is not an IDR tile group), the following apply:

For each reference picture in the DPB that is marked as "used for short-term reference," when it is referred to by an LTRP entry in RefPicList[0] or RefPicList[1], the reference picture is marked as "used for long-term reference."

Each reference picture in the DPB that is not referred to by any entry in RefPicList[0] or RefPicList[1] is marked as "unused for reference".

The concepts of the present disclosure are further discussed.

In order to solve the above problems, the following aspects are disclosed, each of them can be applied individually and some of them can be applied in combination.

1) When a picture has more than one sub-picture, it is allowed to have both TRAP sub-picture and non-TRAP sub-picture in the picture.
   a. A sub-picture within a picture can be a slice, a tile group, an MCTS, or any other subset of the picture.
   b. A sub-picture is usually exclusively carried in its own NAL unit, although that is not necessarily always the case.
2) Information for MCTS description may be present/signaled in parameter set, tile group header, or supplemental enhancement information (SEI) message.
3) Alternatively, item 1) can be expressed such that when a coded picture is carried in more than one NAL unit, one or more of those NAL units may be of an TRAP NAL unit type and one or more of those NAL units may be of a non-IRAP NAL unit type (trailing NAL unit type).
4) When a picture has more than one sub-picture and the sub-pictures are a mix of IRAP sub-pictures and non-IRAP sub-pictures, the picture is required to have Temporand equal to 0.
5) When a picture has more than one sub-picture and the sub-pictures are a mix of IRAP sub-pictures and non-IRAP sub-pictures, the IRAP sub-picture may be required to be part of an MCTS.
6) When a picture has more than one sub-picture and the sub-pictures are a mix of IRAP sub-pictures and non-IRAP sub-pictures, an access unit delimiter may be required to be present in the bitstream and associated with the picture to assist systems/applications to easily identify an access unit.
7) A flag is present in a parameter set that is referred to directly or indirectly by tile groups to specify whether or not there may be pictures with mixed TRAP and non-TRAP sub-pictures.
   a. The flag can be signaled in a parameter set such as the sequence parameter set, the picture parameter set, or another type of parameter set that is referred to directly or indirectly by tile groups. In particular, signaling of the flag in the sequence parameter set may be preferable.
   b. The flag may be called sps_mixed_tile_groups_in_pic_flag.
8) For a NAL unit containing an IDR tile group, a flag is present in its tile group header to specify whether or not POC MSB is reset in the POC derivation for the picture.
9) A variable called PicRefreshFlag is defined and is associated with a picture. This flag specifies whether POC derivation and the DPB state needs to be refreshed when decoding the picture.
10) The value of PicRefreshFlag is derived as follows:
    a. If the current tile group belongs to the first access unit in the bitstream, PicRefreshFlag is set equal to 1.
    b. Otherwise if the current tile group is an IDR tile group, PicRefreshFlag is set equal to sps_mixed_tile_groups_in_pic_flag?poc_msb_reset_flag:1.
    c. Otherwise if the current tile group is a CRA tile group, the following applies:
       i. If the current access unit is the first access unit of a coded sequence (i.e., it immediately follows an end of sequence NAL unit, or the associated variable HandleCraAsFirstPicInCvsFlag is equal to 1), PicRefreshFlag is set equal to 1.
       ii. Otherwise, PicRefreshFlag is set equal to 0.
    d. Otherwise (the current tile group does not belong to the first access unit in the bitstream and it is not an TRAP tile group), PicRefreshFlag is set equal to 0.
11) When PicRefreshFlag is equal to 1, the value of POC MSB (i.e., PicOrderCntMsb) is reset (i.e., set equal to 0) during derivation of POC for the picture.
12) When sps_mixed_tile_group_in_pic_flag is equal to 1, the following constraints apply:
    a. When all tile groups of the current picture are IDR tile groups, the value of poc_msb_reset_flag shall be equal to 1 for all the IDR tile groups of the current picture.
    b. When the current picture contains an IDR tile group and at least one tile group that is not an IDR tile group, the value of poc_msb_reset_flag shall be equal to 0
13) When an MCTS is extracted to be a sub-bitstream from an original bitstream with sps_mixed_tile_groups_in_pic_flag equal to 1, the value of sps_mixed_tile_groups_in_pic_flag in the active SPSs for the extracted sub-bitstream has to be set equal to 0, i.e., in the extracted sub-bitstream each picture has to has either TRAP tile groups only or non-TRAP tile groups only. In other words, it is required that tile groups that belong to one picture and belong to one MCTS must have the same NAL unit type.
14) Information needed for reference picture management such as reference picture set (RPS) or reference picture list (RPL) is signaled in tile group header regardless its NAL unit type. Alternatively, such information may be signaled only in picture headers (if picture header exists).
15) Reference picture lists (e.g., RefPicList[0] and RefPicList[1] for RPL approach or RefPicList0[ ] and RefPicList1[ ] for RPS approach or similar lists containing reference pictures for inter-prediction operation of a picture) are constructed at the beginning of the decoding of each tile group regardless its NAL unit type.
16) Reference picture marking process is done by checking each reference pictures in the DPB whether it is referred to by an entry in the signaled reference picture management information (e.g., RefPicList[0] and RefPicList[1] for the RPL approach or the RPS subsets for the RPS approach).
17) When PicRefreshFlag is equal to 1, during the reference picture marking process, all reference pictures in the DPB are marked as "unused for reference".
18) The detail of reference picture marking process for the RPL approach is as follows:
    a. If PicRefreshFlag is equal to 1, all reference pictures in the DPB are marked as "unused for reference".
    b. Otherwise, the following apply:
    i. For each reference picture in the DPB that is marked as "used for short-term reference", when it is referred to by an LTRP entry in RefPicList[0] or RefPicList[1], the reference picture is marked as "used for long-term reference".
    ii. Each reference picture in the DPB that is not referred to by any entry in RefPicList[0] or RefPicList[1] is marked as "unused for reference".

Figure 9:
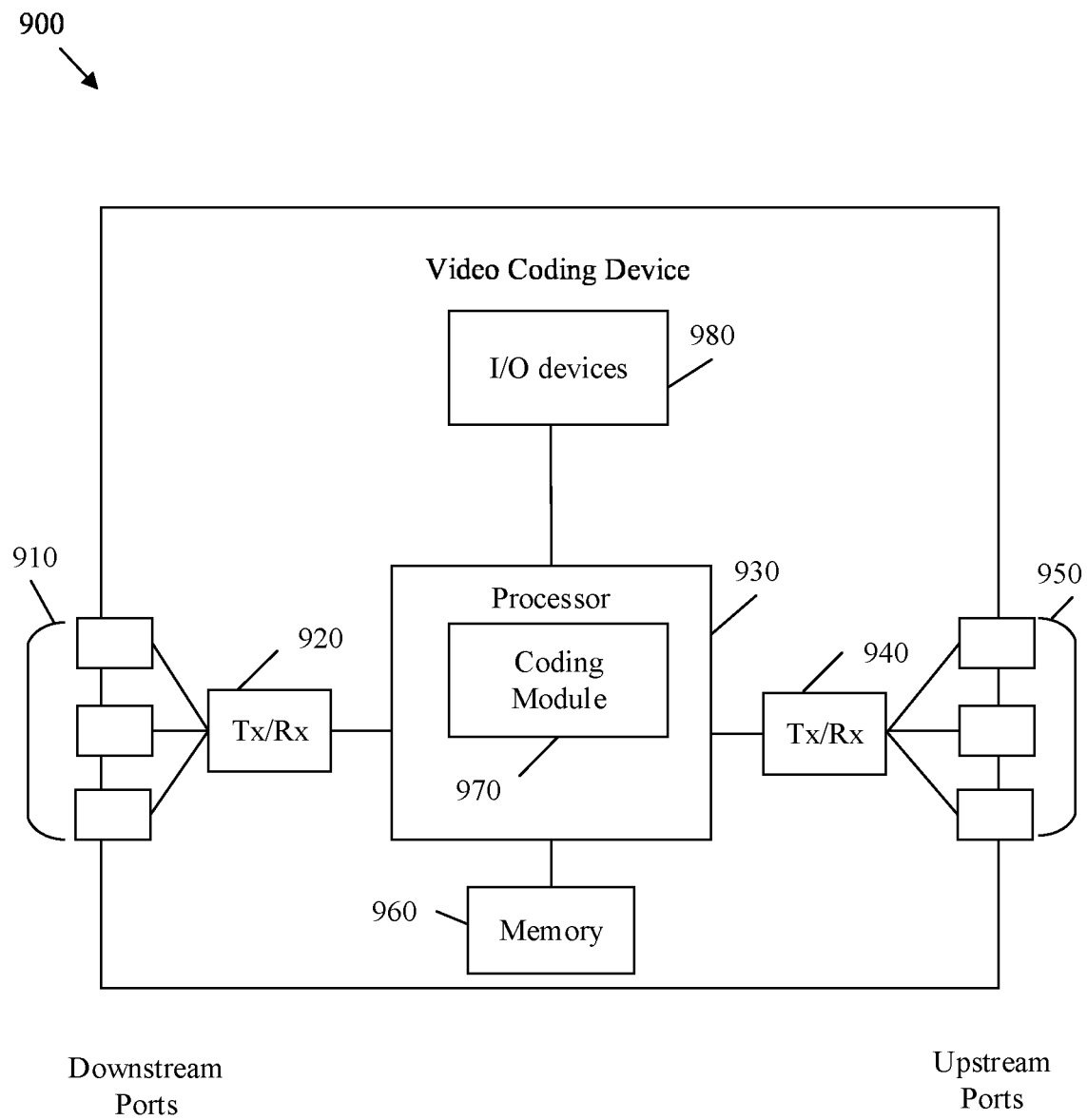
FIG. 9 is a schematic diagram of a video coding device.

FIG. 9 is a schematic diagram of a video coding device 900 (e.g., a video encoder 20 or a video decoder 30) according to an embodiment of the disclosure. The video coding device 900 is suitable for implementing the disclosed embodiments as described herein. The video coding device 900 comprises ingress ports 910 and receiver units (Rx) 920 for receiving data; a processor, logic unit, or central processing unit (CPU) 930 to process the data; transmitter units (Tx) 940 and egress ports 950 for transmitting the data; and a memory 960 for storing the data. The video coding device 900 may also comprise optical-to-electrical (OE) components and electrical-to-optical (EO) components coupled to the ingress ports 910, the receiver units 920, the transmitter units 940, and the egress ports 950 for egress or ingress of optical or electrical signals.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the ingress ports 910, receiver units 920, transmitter units 940, egress ports 950, and memory 960. The processor 930 comprises a coding module 970. The coding module 970 implements the disclosed embodiments described above. For instance, the coding module 970 implements, processes, prepares, or provides the various networking functions. The inclusion of the coding module 970 therefore provides a substantial improvement to the functionality of the video coding device 900 and effects a transformation of the video coding device 900 to a different state. Alternatively, the coding module 970 is implemented as instructions stored in the memory 960 and executed by the processor 930.

The video coding device 900 may also include input and/or output (I/O) devices 980 for communicating data to and from a user. The I/O devices 980 may include output devices such as a display for displaying video data, speakers for outputting audio data, etc. The I/O devices 980 may also include input devices, such as a keyboard, mouse, trackball, etc., and/or corresponding interfaces for interacting with such output devices.

The memory 960 comprises one or more disks, tape drives, and solid-state drives and may be used as an overflow data storage device, to store programs when such programs are selected for execution, and to store instructions and data that are read during program execution. The memory 960 may be volatile and/or non-volatile and may be read-only memory (ROM), random access memory (RAM), ternary content-addressable memory (TCAM), and/or static random-access memory (SRAM).

Figure 10:
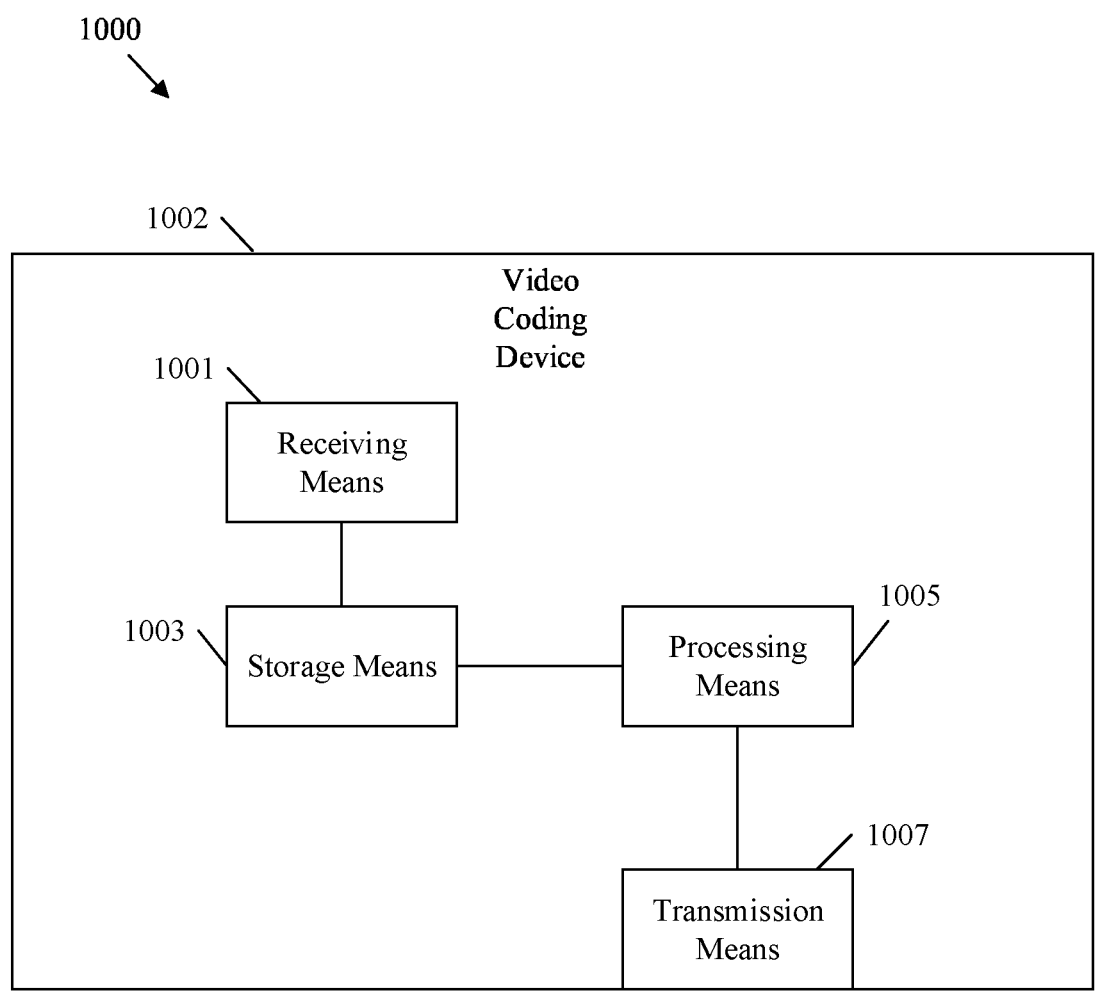
FIG. 10 is a schematic diagram of an embodiment of a means for coding.

FIG. 10 is a schematic diagram of an embodiment of a means for coding 1000. In embodiment, the means for coding 1000 is implemented in a video coding device 1002 (e.g., a video encoder 20 or a video decoder 30). The video coding device 1002 includes receiving means 1001. The receiving means 1001 is configured to receive a picture to encode or to receive a bitstream to decode. The video coding device 1002 includes transmission means 1007 coupled to the receiving means 1001. The transmission means 1007 is configured to transmit the bitstream to a decoder or to transmit a decoded image to a display means (e.g., one of the I/O devices 980).

The video coding device 1002 includes a storage means 1003. The storage means 1003 is coupled to at least one of the receiving means 1001 or the transmission means 1007. The storage means 1003 is configured to store instructions. The video coding device 1002 also includes processing means 1005. The processing means 1005 is coupled to the storage means 1003. The processing means 1005 is configured to execute the instructions stored in the storage means 1003 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A decoding device comprising a receiver and a processor, the decoding device configured to:
   receive a bitstream comprising:
      a picture including a first sub-picture and a second sub-picture, wherein the bitstream is in a format that allows the first and second sub-pictures to include more than one slice, wherein the first sub-picture is an intra random access point (IRAP) sub-picture having an instantaneous decoding refresh (IDR) network abstraction layer (NAL) unit type or a clean random access (CRA) NAL unit type and the second sub-picture is a non-IRAP sub-picture having a trailing NAL unit type; and
      a reference picture list (RPL) for the second sub-picture; and
      a flag that indicates a presence in the bitstream of sub-pictures of different types, wherein the flag being equal to 1 indicates that sub-pictures in the picture have both IRAP sub-pictures and non-IRAP sub-pictures, and wherein the flag being equal to 0 indicates that all sub-pictures in the picture can be either only IRAP sub-pictures or only non-IRAP sub-pictures;
   decode the first sub-picture;
   decode the second sub-picture using the RPL; and
   generate the picture based on the first sub-picture and the second sub-picture as decoded.

2. The decoding device of claim 1, wherein the bitstream comprises a divided bitstream containing a first sub-bitstream and a second sub-bitstream.

3. The decoding device of claim 1, wherein the first sub-picture is disposed in a first sub-bitstream and the second sub-picture is disposed in a second sub-bitstream.

4. The decoding device of claim 1, wherein the IRAP sub-picture is an IDR picture.

5. The decoding device of claim 1, wherein the first sub-picture is contained within a set of first NAL units and the second sub-picture is contained within a set of second NAL units.

6. The decoding device of claim 1, wherein the picture comprises a mixed IRAP picture.

7. The decoding device of claim 6, wherein the flag is in a picture parameter set (PPS) of the bitstream.

8. The decoding device of claim 1, wherein the IRAP sub-picture is a CRA picture.

9. An encoding device, comprising one or more processors, the encoding device configured to:
obtain a picture including a first sub-picture and a second sub-picture, wherein the first sub-picture is an intra random access point (IRAP) sub-picture having an instantaneous decoding refresh (IDR) network abstraction layer (NAL) unit type or a clean random access (CRA) NAL unit type and the second sub-picture is a non-IRAP sub-picture having a trailing NAL unit type;
obtain a reference picture list (RPL) for the second sub-picture;
encode a flag into the bitstream, wherein the flag indicates a presence in the bitstream of sub-pictures of different types, wherein the flag being equal to 1 indicates that sub-pictures in the picture have both IRAP sub-pictures and non-IRAP sub-pictures, and wherein the flag being equal to 0 indicates that all sub-pictures in the picture can be either only IRAP sub-pictures or only non-IRAP sub-pictures; and
encode the picture and the RPL into the bitstream, wherein the bitstream is in a format that allows sub-pictures to include more than one slice.

10. The encoding device of claim 9, wherein the encoding device is further configured to store the bitstream for transmission toward a video decoder.

11. The encoding device of claim 9, wherein the bitstream comprises a first sub-bitstream and a second sub-bitstream.

12. The encoding device of claim 9, wherein the first sub-picture is encoded in a first sub-bitstream and the second sub-picture is encoded in a second sub-bitstream.

13. The encoding device of claim 9, wherein the IRAP sub-picture is an IDR picture or a CRA picture.

14. The encoding device of claim 9, wherein the first sub-picture is the IRAP sub-picture contained within a set of first NAL units and the second sub-picture is the non-IRAP sub-picture contained within a set of second NAL units.

15. The encoding device of claim 9, wherein the flag is in a picture parameter set (PPS) of the bitstream.

16. A non-transitory computer-readable recording medium storing a bitstream, the bitstream comprising compressed video data and one or more syntax elements, the syntax elements used as instructions that describe how to reconstruct a picture by processing of the compressed video data, the instructions executable by a video decoding device to perform steps:
wherein the bitstream further comprises:
the picture including a first sub-picture and a second sub-picture, wherein the bitstream is in a format that allows the first and second sub-pictures to include more than one slice, wherein the first sub-picture is an intra random access point (IRAP) sub-picture contained within a set of first network abstraction layer (NAL) units having an instantaneous decoding refresh (IDR) NAL unit type or a clean random access (CRA) NAL unit type and the second sub-picture is a non-IRAP sub-picture contained within a set of second NAL units having a trailing NAL unit type;
a flag that indicates a presence in the bitstream of sub-pictures of different types, wherein the flag being equal to 1 indicates that sub-pictures in the picture have both IRAP sub-pictures and non-IRAP sub-pictures, and wherein the flag being equal to 0 indicates that all sub-pictures in the picture can be either only IRAP sub-pictures or only non-IRAP sub-pictures; and
a reference picture list (RPL) for the second sub-picture;
wherein the steps comprise:
decoding the first sub-picture;
decoding the second sub-picture using the RPL; and
reconstructing the picture based on the first sub-picture and the second sub-picture as decoded.

17. The non-transitory computer-readable recording medium of claim 16, wherein the bitstream is a divided bitstream containing a first sub-bitstream and a second sub-bitstream.

18. The non-transitory computer-readable recording medium of claim 16, wherein the first sub-picture is disposed in a first sub-bitstream and the second sub-picture is disposed in a second sub-bitstream.

19. The non-transitory computer-readable recording medium of claim 16, wherein the IRAP sub-picture is an IDR picture or a CRA picture.

20. The decoding device of claim 1, wherein the format of the bitstream allows the sub-pictures to be a rectangular region of the more than one slice within the picture.

21. The encoding device of claim 9, wherein the format of the bitstream allows the sub-pictures to be a rectangular region of the more than one slice within the picture.

22. The non-transitory computer-readable recording medium of claim 16, wherein the format of the bitstream allows the sub-pictures to be a rectangular region of the more than one slice within the picture.

* * * * *